US007676456B2

United States Patent
Suganuma et al.

(10) Patent No.: US 7,676,456 B2
(45) Date of Patent: Mar. 9, 2010

(54) SYSTEM AND METHOD FOR CONTROLLING DATABASE ACCESS

(75) Inventors: Toshio Suganuma, Yokohama (JP); Akira Koseki, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/503,620

(22) Filed: Aug. 14, 2006

(65) Prior Publication Data
US 2007/0050367 A1    Mar. 1, 2007

(30) Foreign Application Priority Data
Aug. 31, 2005    (JP)    ............... 2005-251594

(51) Int. Cl.
*G06F 17/30*    (2006.01)
(52) U.S. Cl. .......................................... 707/3; 707/103
(58) Field of Classification Search ...................... 707/3
See application file for complete search history.

(56) References Cited
U.S. PATENT DOCUMENTS 5,742,806 A * 4/1998 Reiner et al. ................... 707/3
5,930,785 A * 7/1999 Lohman et al. ................. 707/2
6,023,695 A * 2/2000 Osborn et al. .................. 707/3
6,078,926 A * 6/2000 Jensen et al. ............ 707/103 R

OTHER PUBLICATIONS

Dittrich et al., Data Redundancy and Duplicate Detection in Spactial Join Proceedings. 16th International Conference on Data Engineering, 2000, (2000).*

* cited by examiner

*Primary Examiner*—Tony Mahmoudi
*Assistant Examiner*—Jensen Hu
(74) *Attorney, Agent, or Firm*—Richard M. Goldman; Shimokaji & Associates, P.C.

(57) ABSTRACT

A system to controls access to a database, including: an acquiring section which acquires an access program including a plurality of database access instructions; a detecting section which detects a plurality of different tables in the database that are accessed by the plurality of access instructions; a join control section which executes a join instruction prior to the execution of the access instructions, the join instruction obtaining a result table from the database by combining the plurality of different tables detected; and a conversion control section which executes a conversion instruction prior to the execution of the plurality of access instructions, the conversion instruction extracting records from the result table for the access instructions and converting the records into the form of a structure accessible for the plurality of access instructions.

16 Claims, 19 Drawing Sheets

[Figure 1]
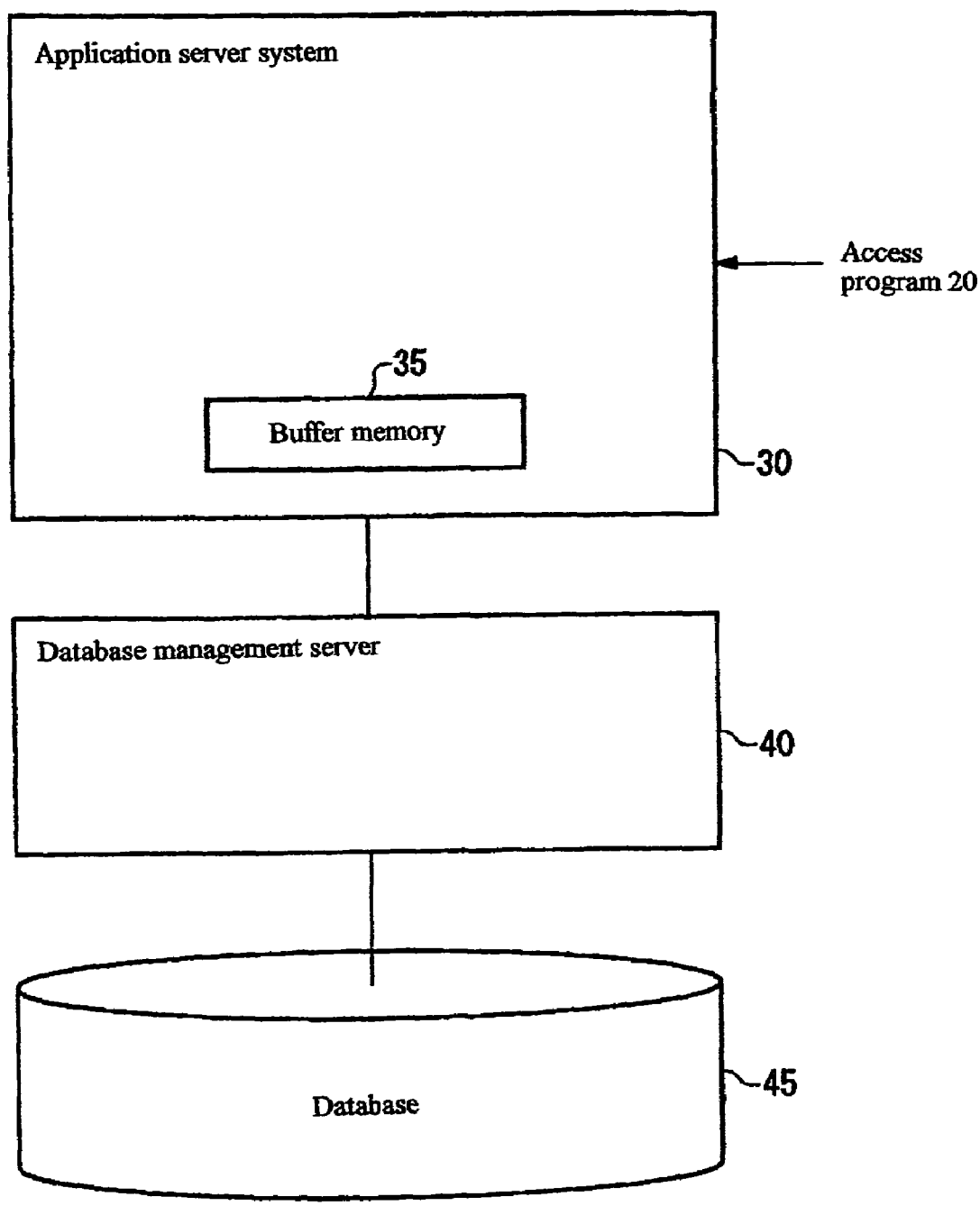

```
1:   processBatchJob() {
2:       /* get input data */
3:       input = inputstream.getMessage();
4:
5:       /* batch outer loop */
6:       for ( ; input != null; ) {
7:           /* begin a new transaction */
8:           userTransaction.begin();
9:
10:          /* batch inner loop (for checkpoint interval) */
11:          for ( ; ShouldCheckpointBeExecuted(); ) {
12:              /* read a new input data */
13:              customerKey = input.customerID;
14:
15:              /* get customer bean */
16:              customer = findByPrimaryKey(customerKey);
17:
18:              if (input.credit_or_debit == CREDIT) {
19:                  /* get creditAccount bean */
20:                  creditKey = customer.getCreditAccount();
21:                  creditAccount = findByPrimaryKey(creditKey);
22:                  /* credit card charge processing here */
23:              } else {
24:                  /* get debitAccount bean */
25:                  debitKey = customer.getDebitAccount();
26:                  debitAccount = findByPrimaryKey(debitKey);
27:                  /* debit card charge processing here */
28:              }
29:              /* get next input data */
30:              input = inputStream.getMessage();
31:          }
32:          /* call a container service for check pointing */
33:          bc.applyCheckpointPolicy();
34:          /* commit the current transaction */
35:          userTransaction.commit();
36:      }
37:  ]
```

[Figure 3]
(a)
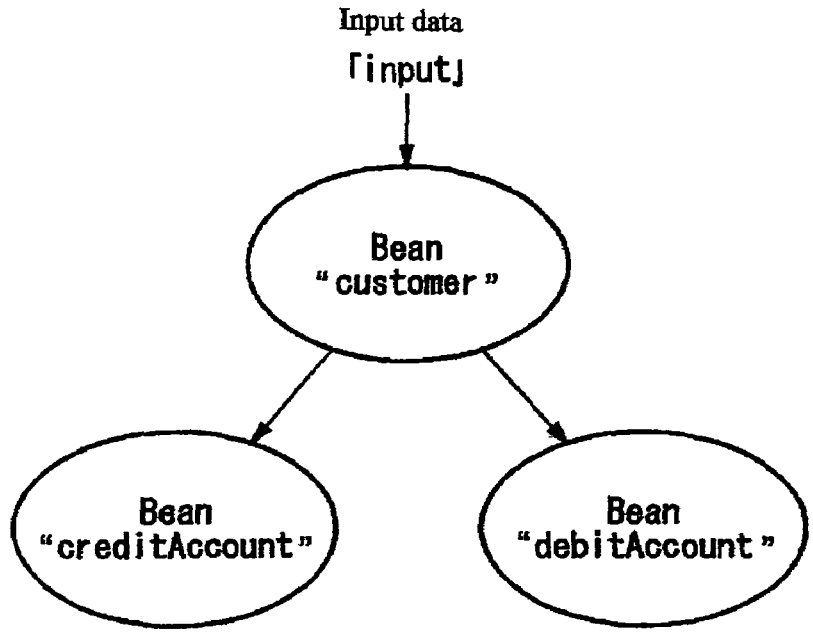
(b-1)
```
1: cID = input.getMessage();
2: A = homeA.findByPrimaryKey(cID);
3: B = homeB.findByPrimaryKey(cID);
```
(b-2)
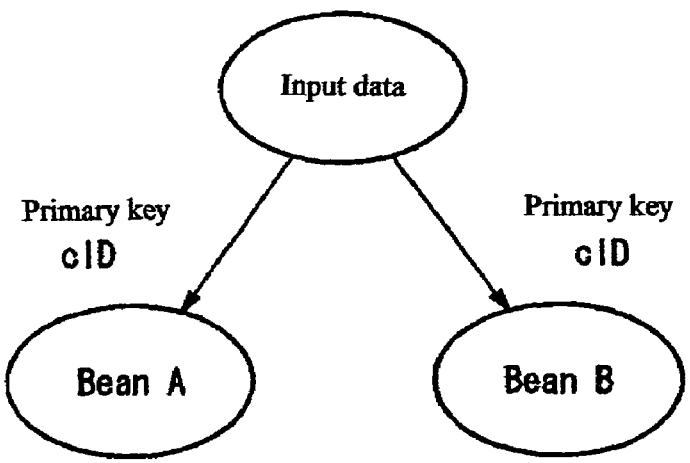

[Figure 4]
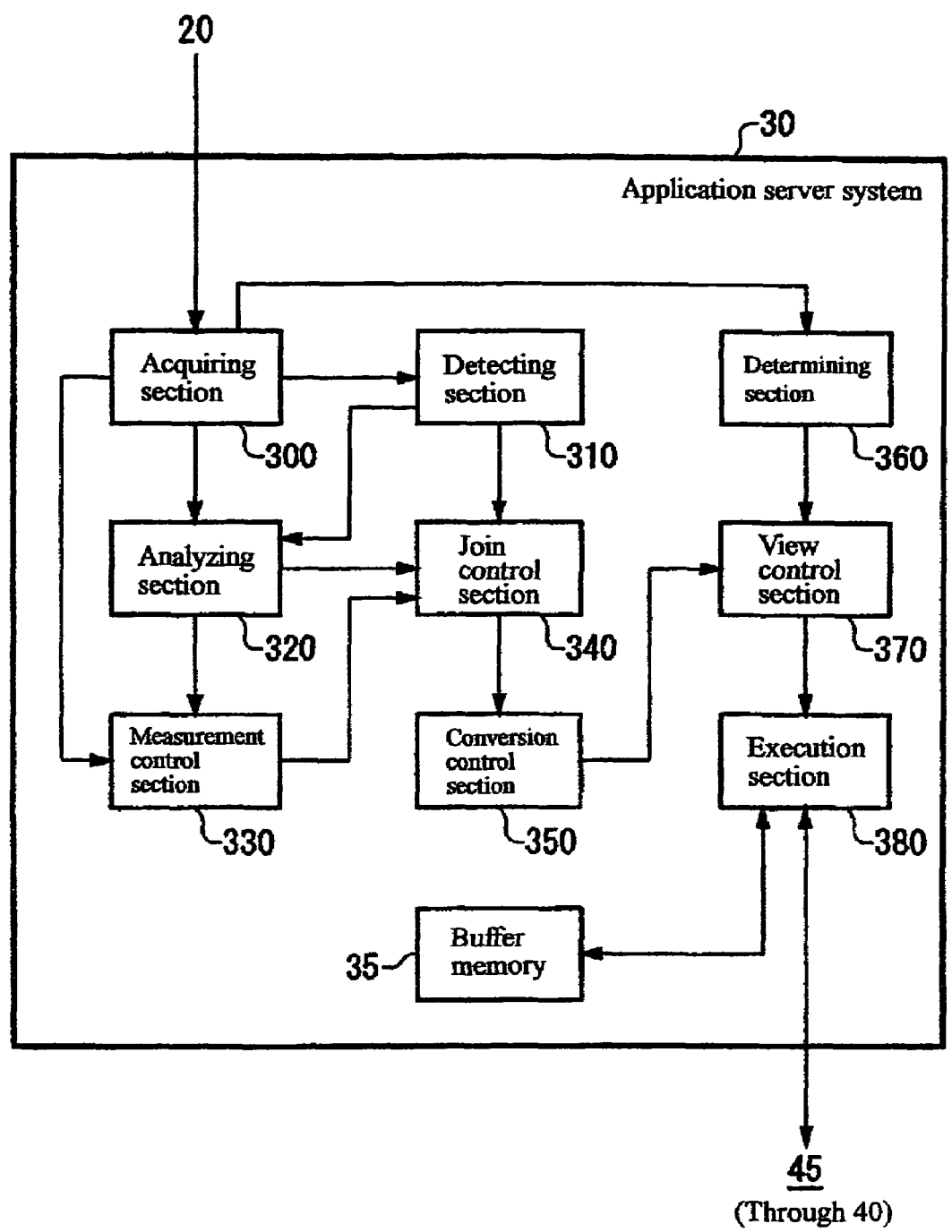

[Figure 5]
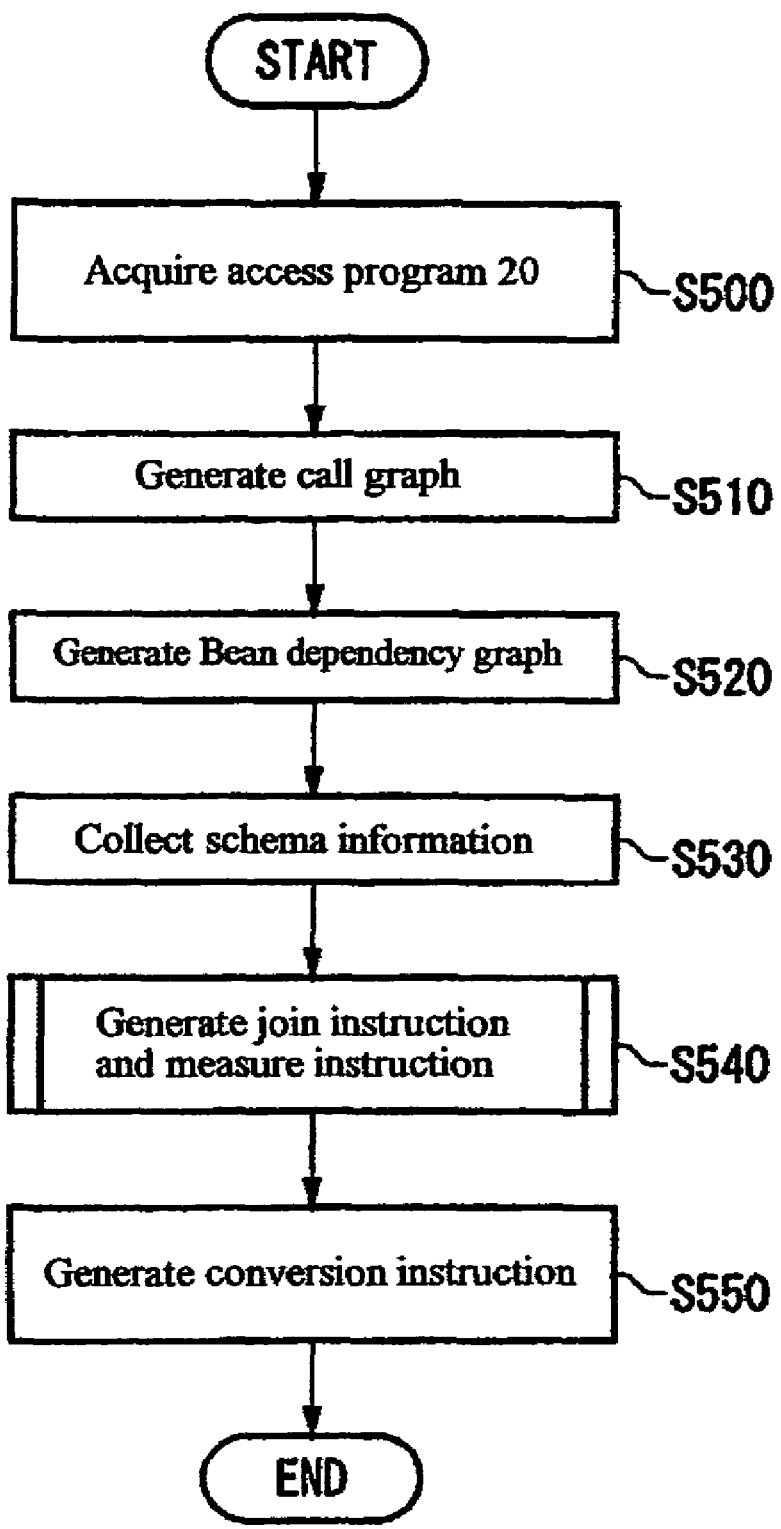

[Figure 6]
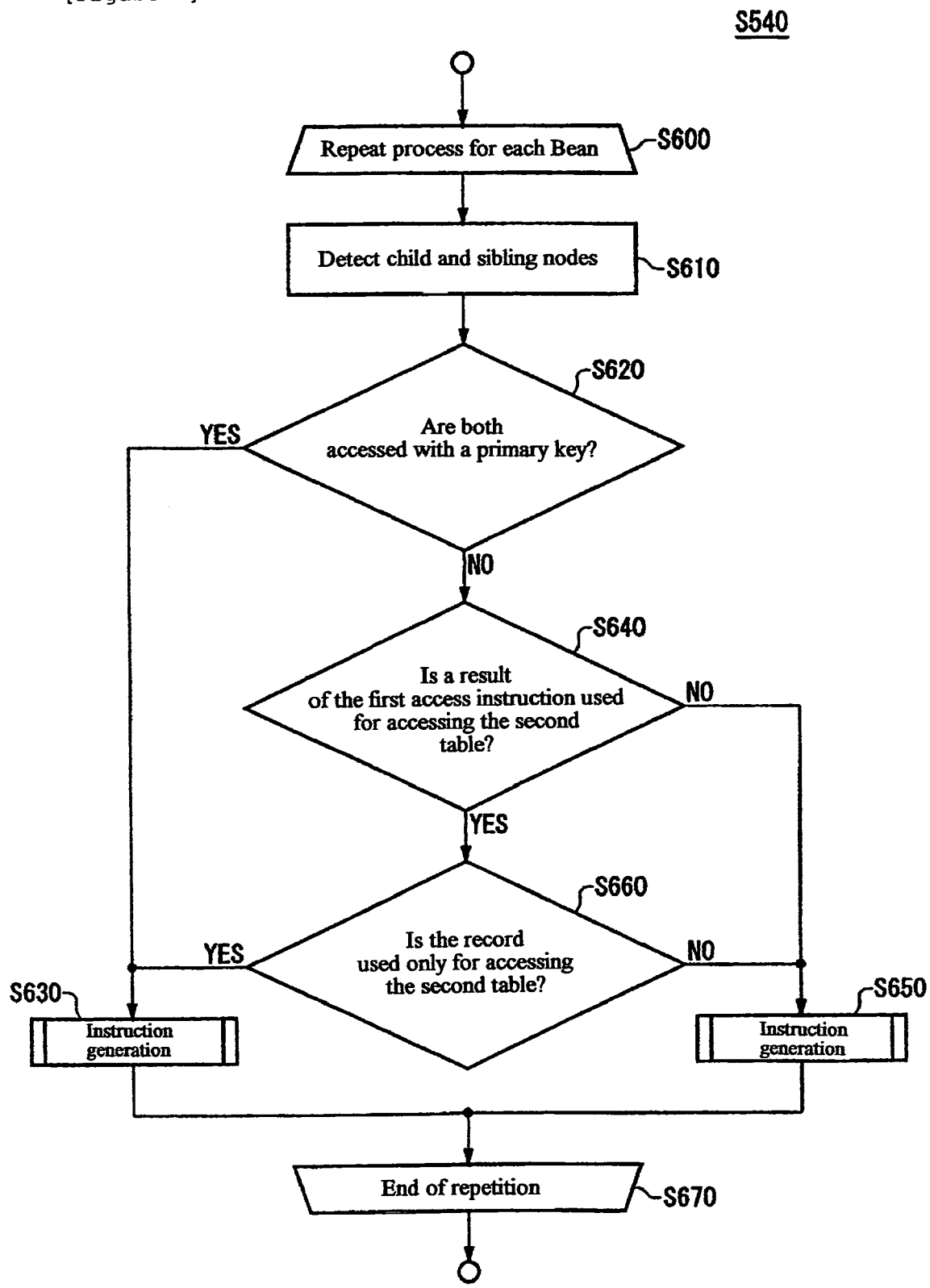

[Figure 7]
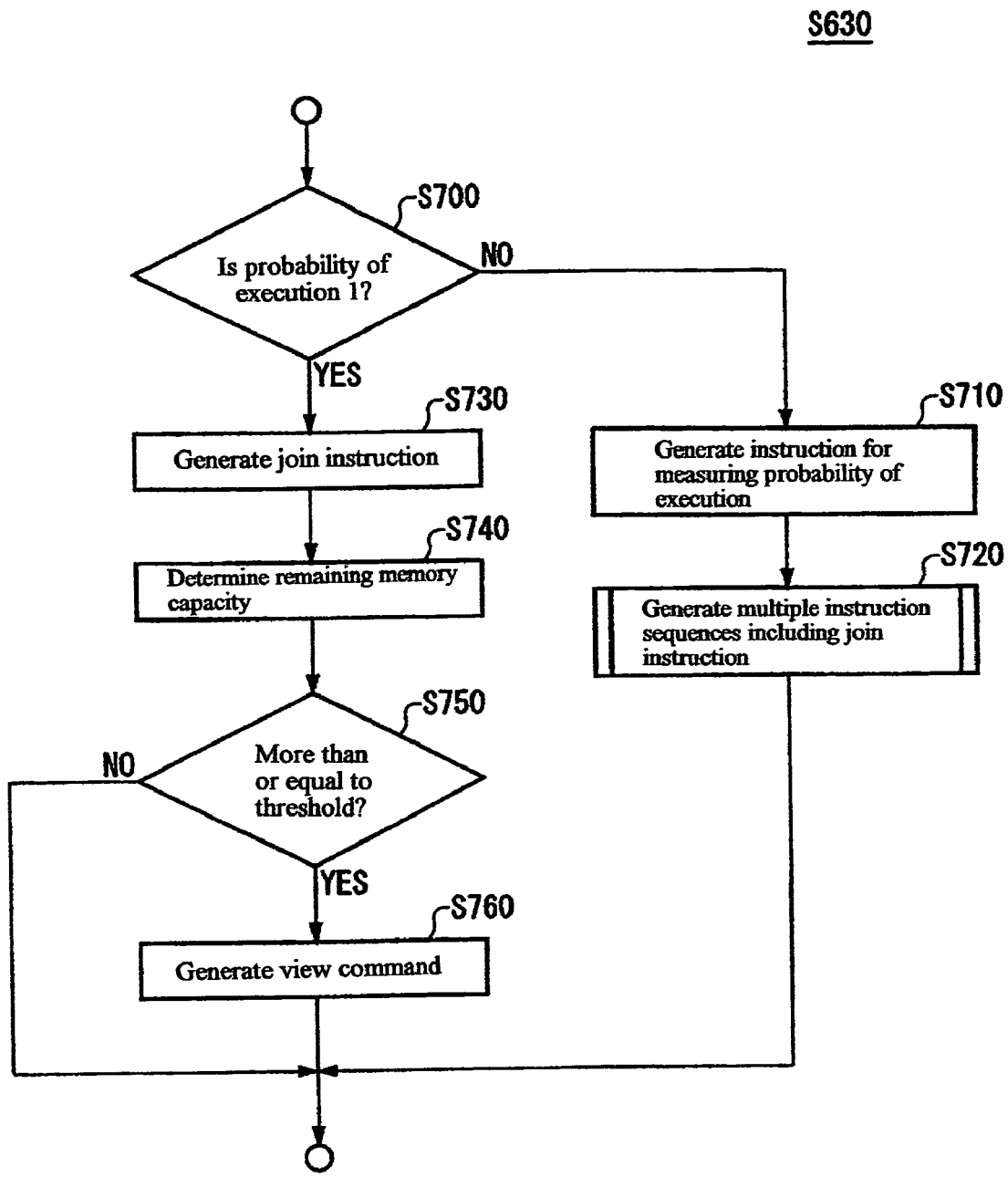

[Figure 8]
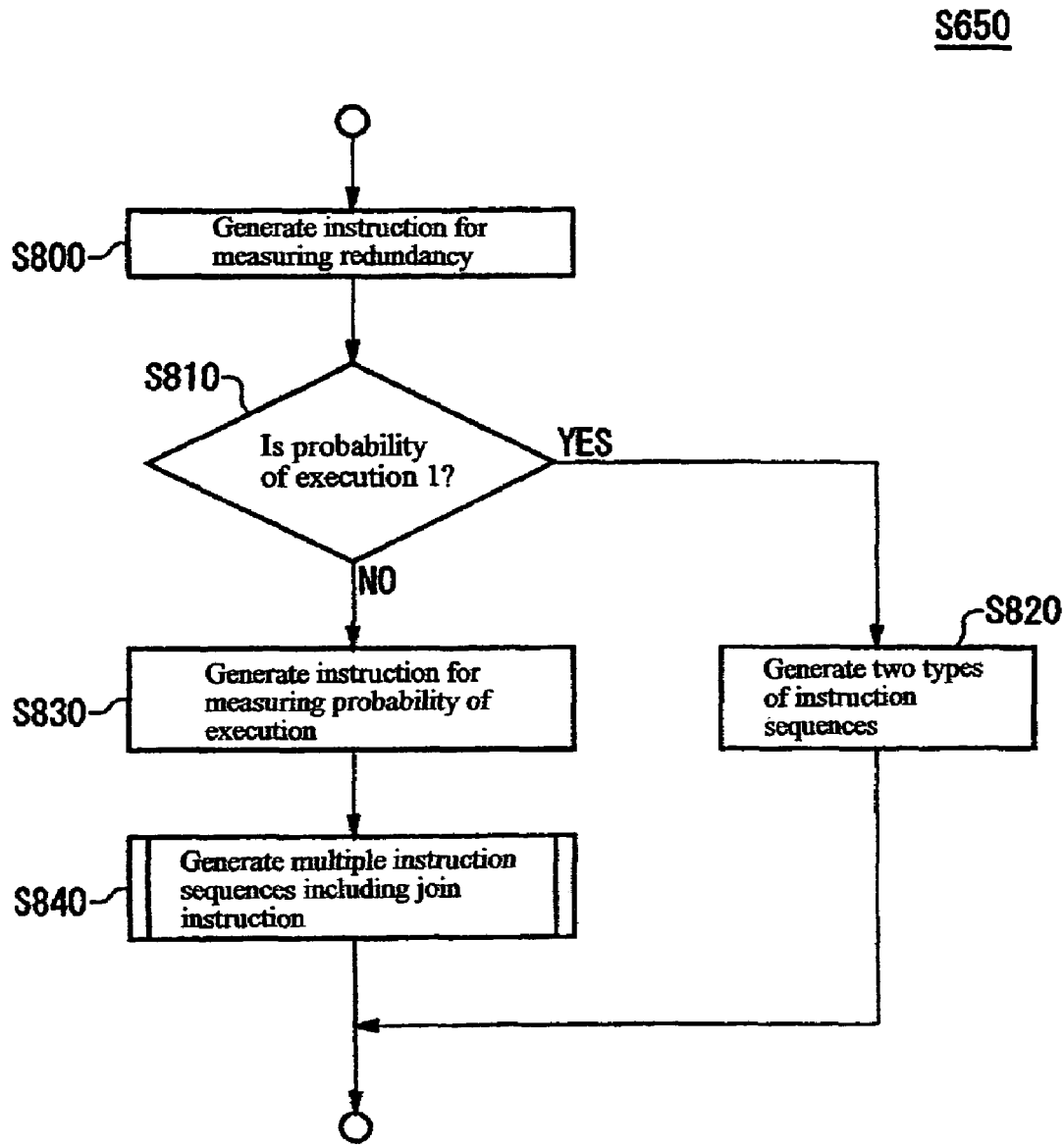

[Figure 9]
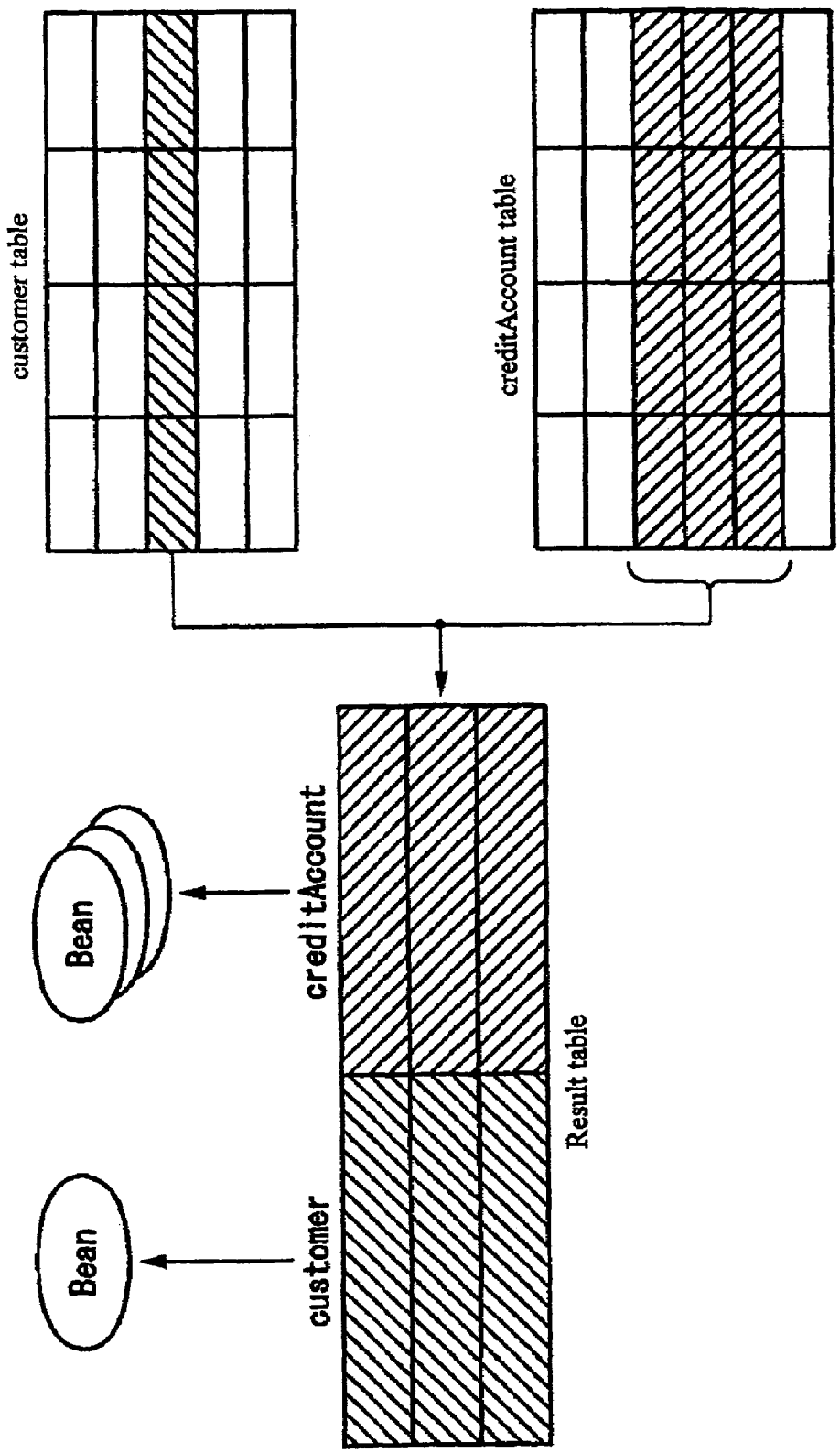

[Figure 10]
(a)
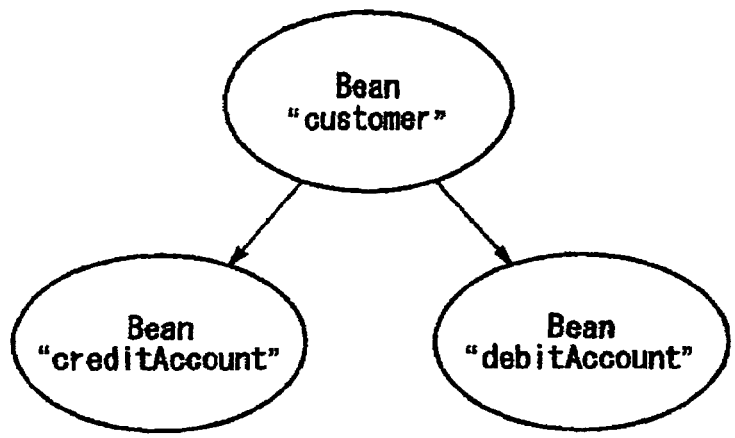
(b)
S720, S840
| | | Probability of execution | |
|---|---|---|---|
| | | Approximately the same | Biased |
| Redundancy | Less than threshold value | Execute the second join instruction for joining 3 tables | Execute the first join instruction for joining 2 tables |
| | Greater than or equal to threshold value | Do not execute join instruction | Do not execute join instruction |

[Figure 11]
(a)
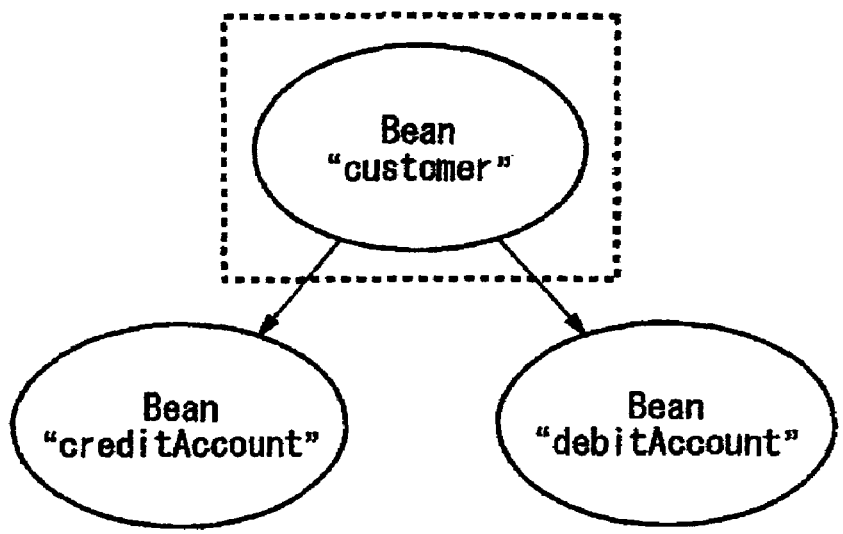
(b)
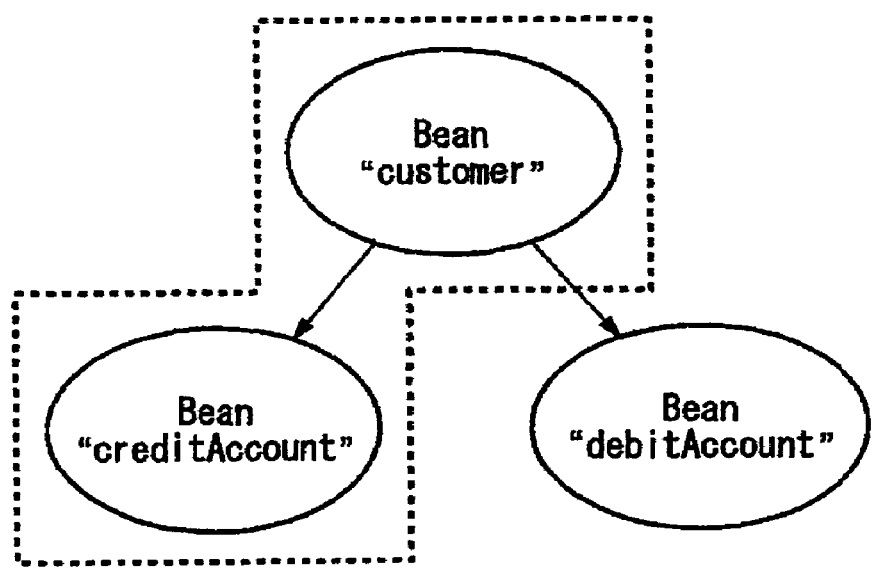

[Figure 12]
(a)
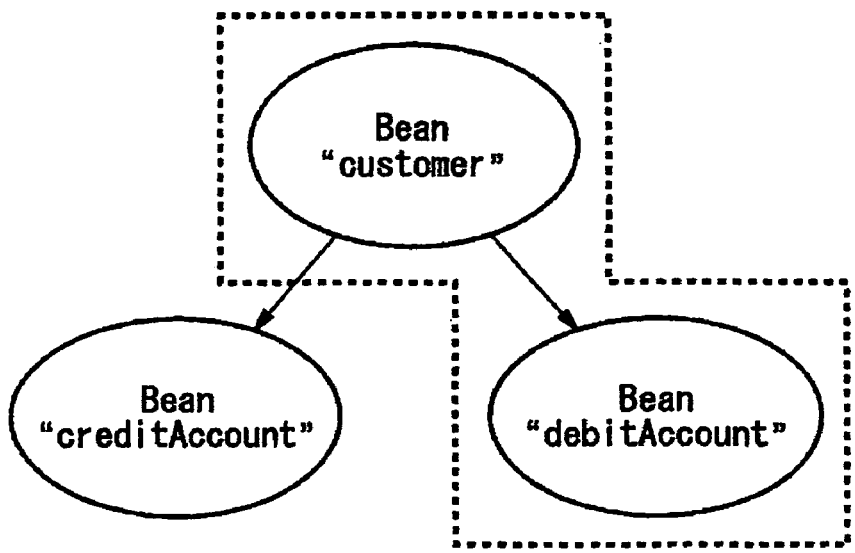
(b)
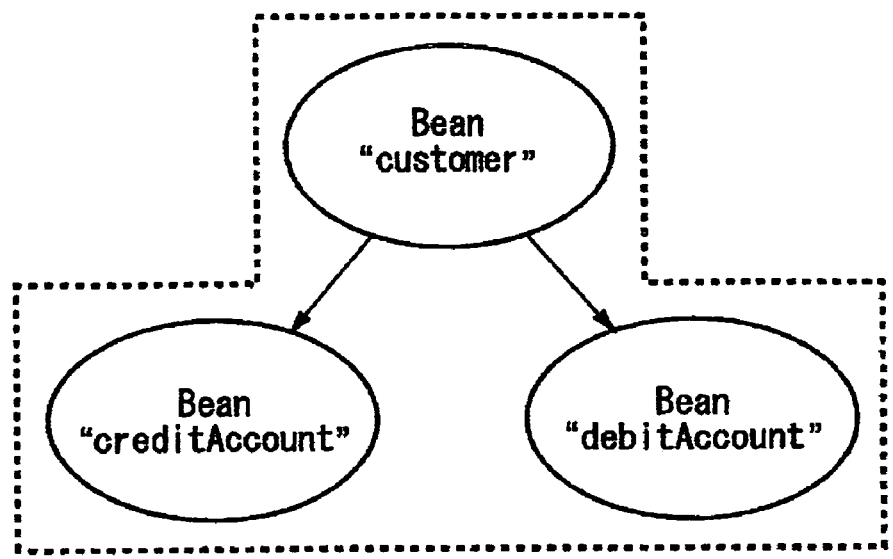

```
1:    processBatchJob() {
2:        /* get input data */
3:        input = inputstream.getMessage();
4:        (View command)
5:        /* batch outer loop */
6:        for ( ; input != null; ) {
7:            /* begin a new transaction */
8:            userTransaction.begin();
9:            Join instruction and conversion instruction
10:           /* batch inner loop (for checkpoint interval) */
11:           for ( ; ShouldCheckpointBeExecuted(); ) {
12:               /* read a new input data */
13:               customerKey = input.customerID;
14:
15:               /* get customer bean */
16:               customer = findByPrimaryKey(customerKey);
17:
18:               if (input.credit_or_debit == CREDIT) {
19:                   /* get creditAccount bean */
20:                   creditKey = customer.getCreditAccount();
21:                   creditAccount = findByPrimaryKey(creditKey);
22:                   (Instructions for measuring redundancy and execution probability)
23:               } else {
24:                   /* get debitAccount bean */
25:                   debitKey = customer.getDebitAccount();
26:                   debitAccount = findByPrimaryKey(debitKey);
27:                   (Instructions for measuring redundancy and execution probability)
28:               }
29:               /* get next input data */
30:               input = inputStream.getMessage();
31:           }
32:           /* call a container service for check pointing */
33:           bc.applyCheckpointPolicy();
34:           /* commit the current transaction */
35:           userTransaction.commit();
36:       }
37:   }
```

[Figure 14]
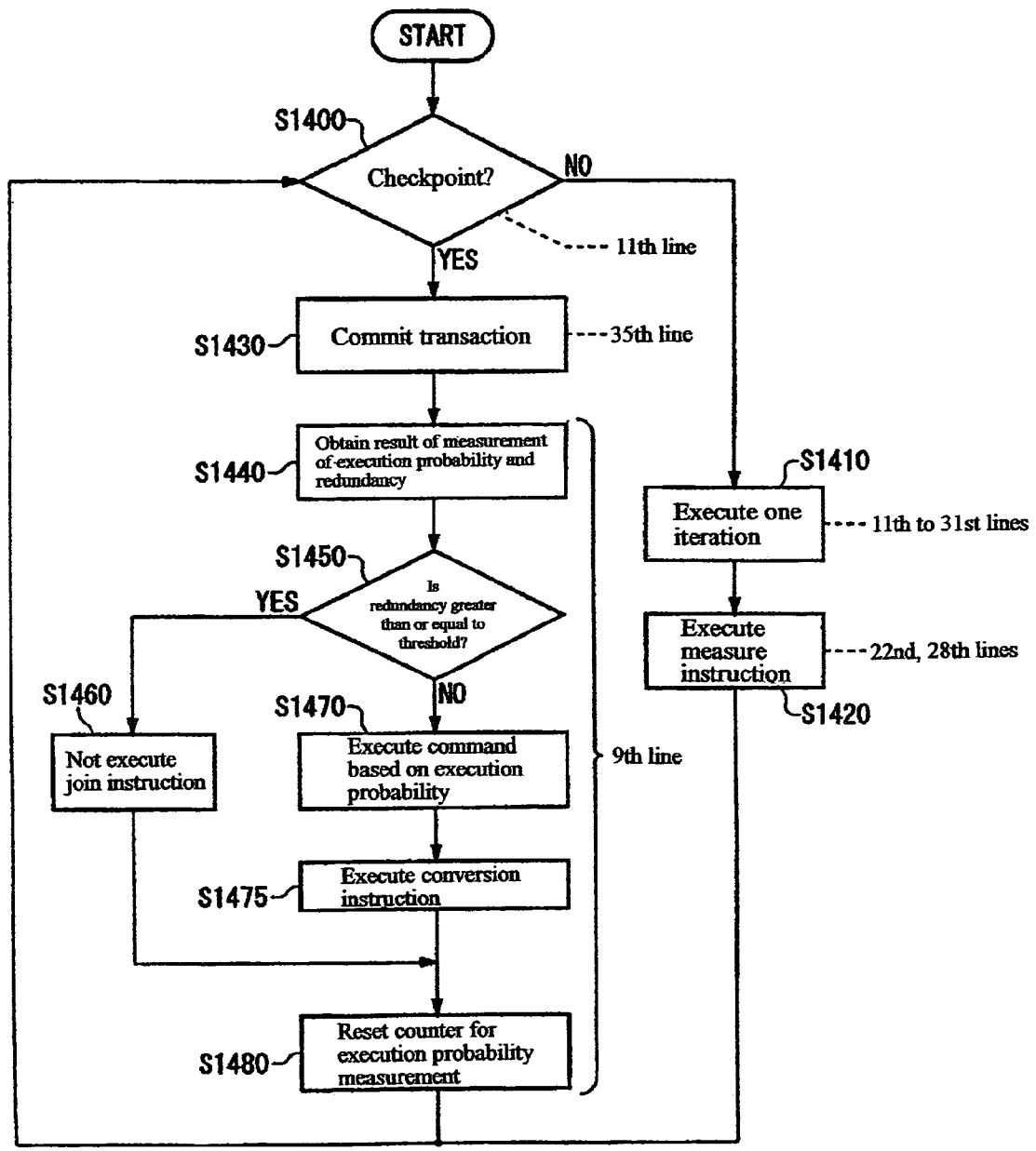

[Figure 15]
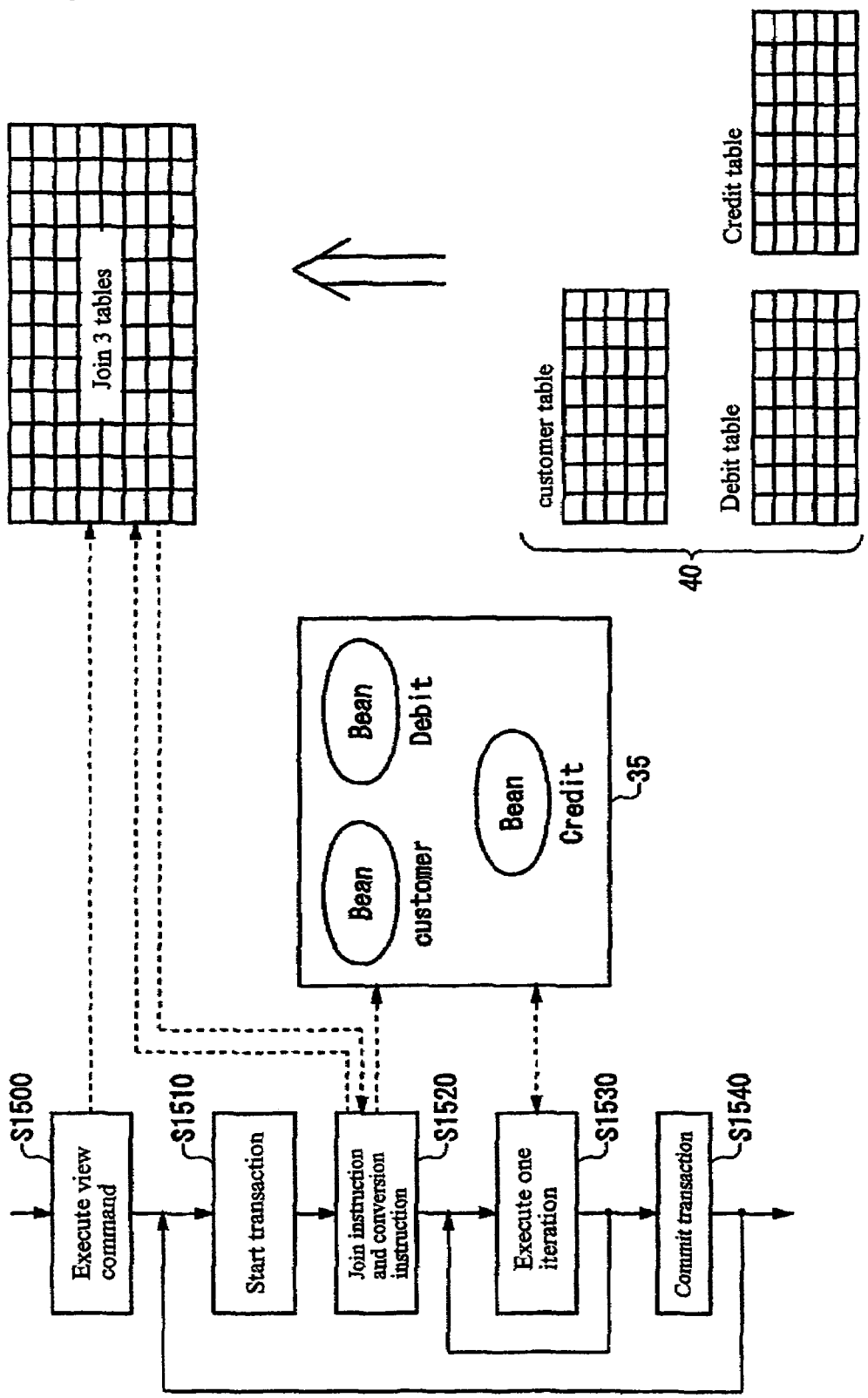

[Figure 16]
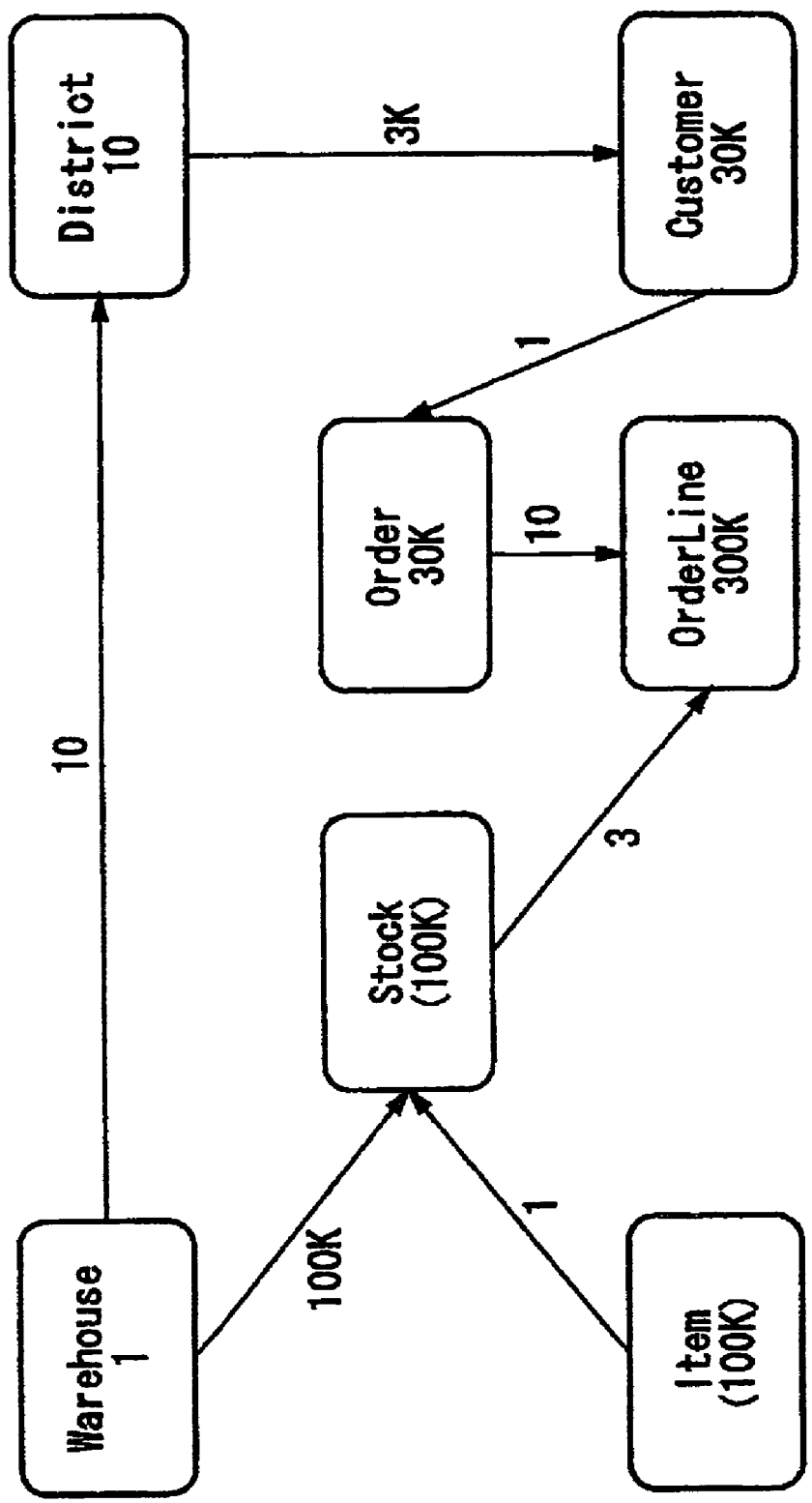

[Figure 17]
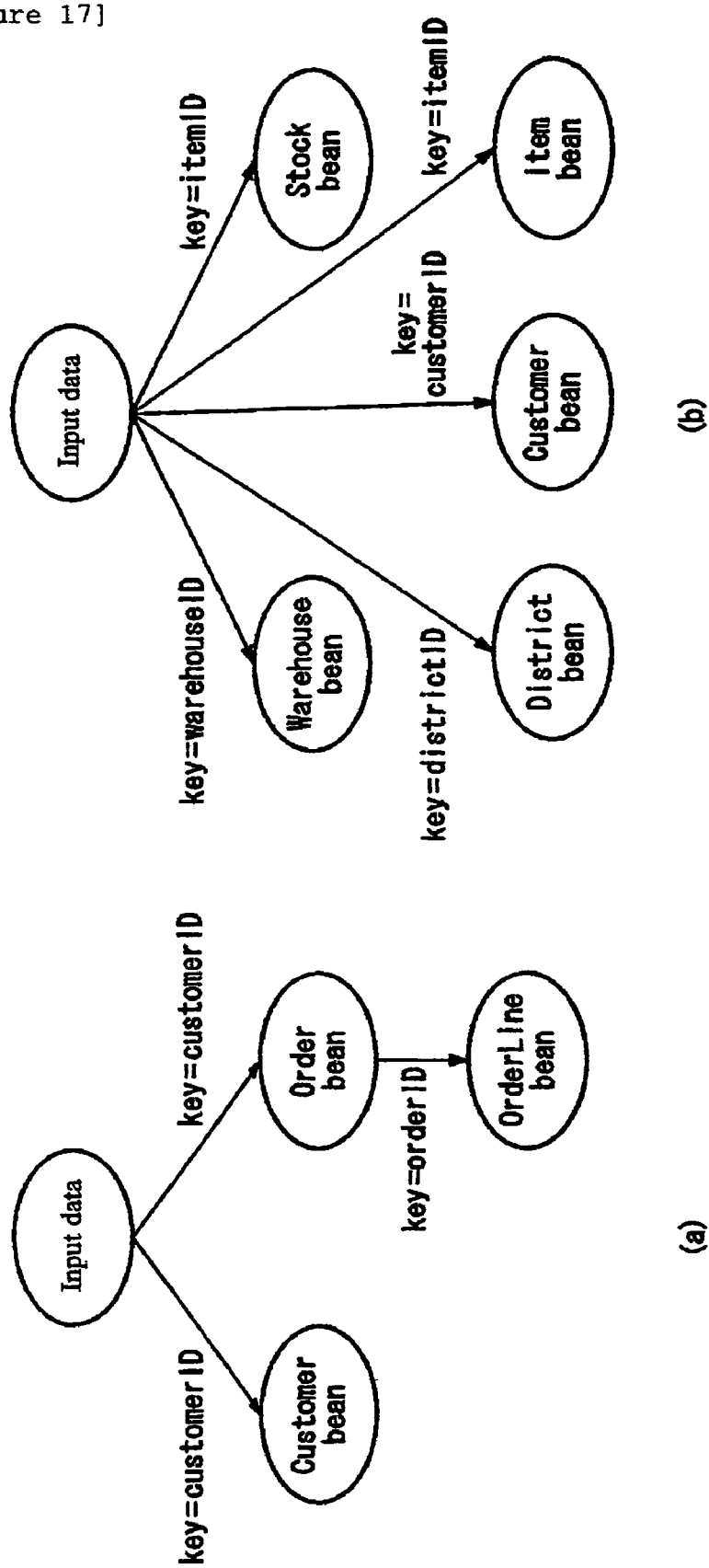

[Figure 18]

| Table name | Primary key | Access record length |
|---|---|---|
| Warehouse | warehouseID | 6 |
| District | districtID | 10 |
| Customer | customerID | 26 |
| Order | customerID | 32 |
| OrderLine | orderID | 62 |
| Item | itemID | 82 |
| Stock | itemID | 90 |

[Figure 19]
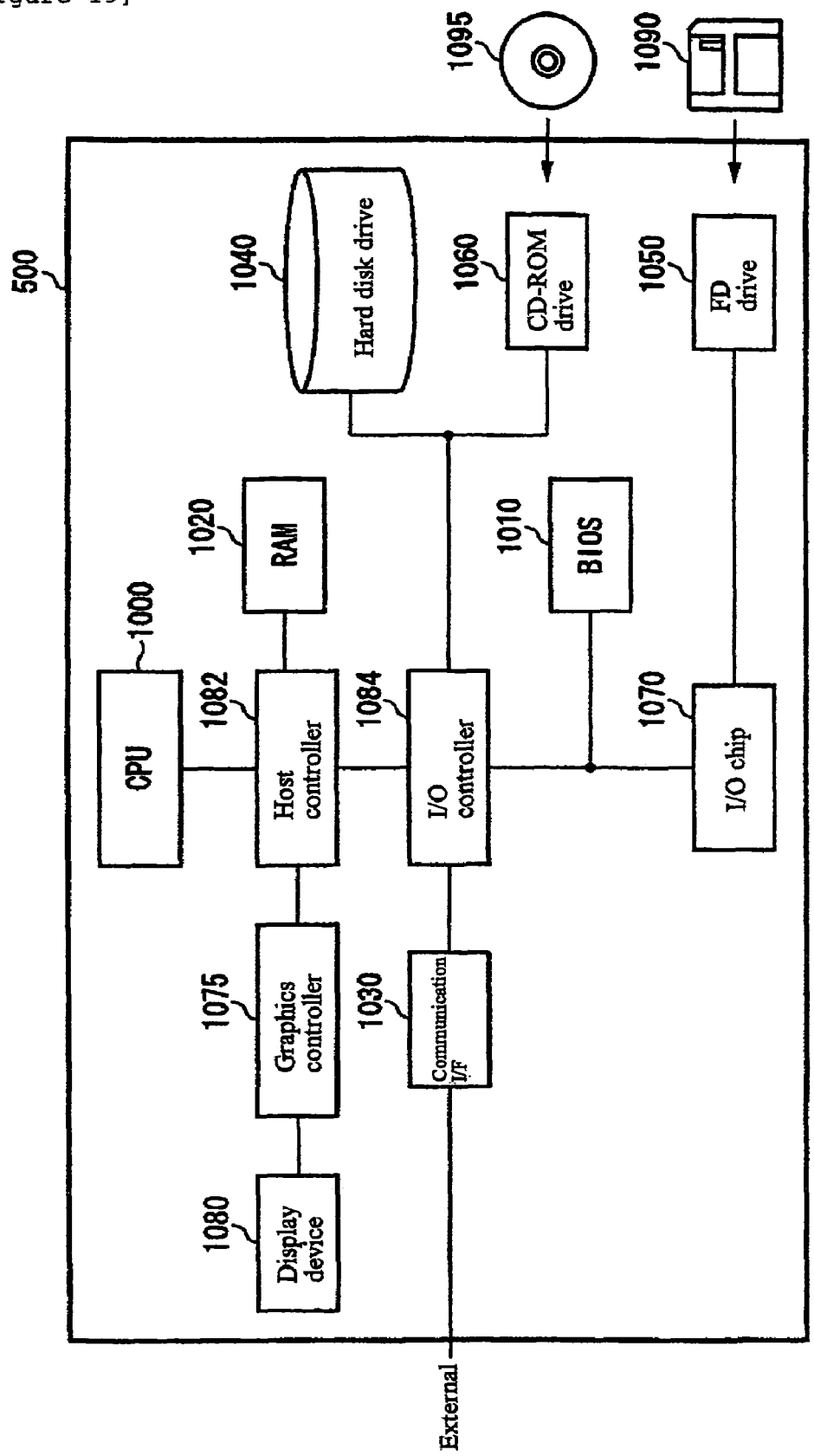

SYSTEM AND METHOD FOR CONTROLLING DATABASE ACCESS

BACKGROUND

1. Field of the Invention

The present invention relates to a system which accesses a database and a method therefor and, in particular, to a system which controls access to a database and a method therefor.

2. Background Art

Business application programs frequently access multiple tables, which relate to one another in a database (hereinafter referred to as a DB). For example, a program may access a table called "Customer" that manages information of customers to obtain data for a particular customer. The program then may access a table called "Account" that manages customers' accounts to obtain the account data associated with that customer. The program issues separate queries sequentially to the two tables.

In this example, the second access is made by using data retrieved with the first access as a key. That is, the data obtained with the second access depends on the data obtained with the first access. Therefore, there is a problem that these accesses cannot be merged into one by using existing optimization techniques that use data dependencies between the values of variable.

The problem is especially noticeable in batch processing in which the above business logic is repeated many times. One way to optimize batch processing may be to cache data to use in the next round of processing beforehand at each checkpoint operation. For example, values of a variable representing an access key can be analyzed to identify the range of data that will be accessed, and the data in that range can be fetched from a DB beforehand.

However, for the table "Account" mentioned above, the range of data that will be accessed cannot be identified beforehand because the access key is stored in the table "Customer". Consequently, the data cannot be retrieved from the DB beforehand and the DB must be accessed each time in the batch iteration loop. As a result, performance of the entire program can deteriorated.

As another example, a program can access different tables using a single key. In this case, the program issues a query for each table. However, queries to DBs are often sent over an external network, and the efficiency of a program as a whole can degrade as the number of queries increases.

To address these problems, several techniques for controlling access to DBs have been proposed in the past. A brief overview of these techniques will be provided below.

(1) Generation of Inspection Loop

This technique improves the efficiency of access to table B that is made based on data obtained from table A. In this technique, an inspection loop is executed for a result set actually obtained by the query to table A during execution of a program to collect a set of keys to use for accessing table B. Then, an instruction code for obtaining data from table B in the range specified with the set of keys is generated dynamically.

(2) Use of Read-Ahead Mechanism Using CMR (Container Managed Relationship)

This method provides a mechanism that allows a programmer to specify that there are multiple tables that relate each other on an application server. The specified tables are read from the DB using a join operation and then stored in a cache that can be referred to by the program (see WebSphere Journal URL: http://websphere.syscon.com/read/43288.html and WebSphere information center URL: http://publib.boulder.ibm.com/infocenter/wasinfo/v5r0/index.jsp?topic=/com.ibm.websphere.base.doc/info/aes/ae/cejb_read.html). In particular, the programmer uses a specifier called "deployment descriptor" to specify the multiple related tables. An EJB (Enterprise Java® Beans) container that manages the cache issues SQL statements on the basis of the specifier. Java is a registered trademark.

However, in the aforementioned technique that generates the inspection loop, the processing for generating data to be inspected by issuing a query to table A is an extra work of the program. The execution of the inspection loop to analyze the access keys is also an extra of the program. These additional work can degrade the performance of the program as a whole. Furthermore, because SQL statements accessory table B are generated dynamically, static optimization cannot be applied to the SQL statements. Moreover, execution of inspection loops complicates the program and therefore can deteriorate the maintainability and robustness of the program.

In the aforementioned technique that uses the CMR, the programmer must specify mutually related tables, which task adds a burden on programmers. If the technique is to be applied to batch processing without making modifications to the structure of an existing program, the technique has limited applications. That is, in batch processing, in which the same operation is iterated, the relation between records accessed by one iteration and another iteration cannot be specified by the deployment descriptor. Therefore, it is not possible to optimize programs in such a way that a bulk of records required for a set of iterations is fetched at a time before starting the actual iterations.

Another method may be to manually rewrite SQL statements by a programmer. However, this method is not practical because the efficiency varies depending on the ability and experience of programmers, and it takes both costs and true to rewrite individual programs. Rewriting EJB (Enterprise Java® Beans) program involves extensive modifications. Specifically, in an EJB (Enterprise Java® Beans) programming model, each DB record is represented by an entity bean and is accessed with getter or setter methods. The programmer can obtain a required record by using these methods without knowing the structure of the DB. The task for manually integrating multiple DB accesses into one is against this programming model. Even if such integration were possible, the maintainability of the program would be significantly deteriorated.

Therefore, an objective of the present invention is to provide a system, method, and program capable of solving the problems described above. The objective can be achieved by a combination of features defined in the independent Claims of the present invention. The dependent Claims define more advantageous specific examples of the present invention.

SUMMARY OF THE INVENTION

To solve the problems, according to the present invention, there are provided a system, and a method and a program product for causing an information processing apparatus to function as the system are provided, wherein the system controls access to a database and includes: an acquiring section which acquires an access program including a plurality of database access instructions; a detecting section which detects a plurality of different tables in the database that are accessed by the plurality of access instructions; a join control section which executes a join instruction prior to the execution of the access instructions, the join instruction obtaining a result table from the database by combining the plurality of different tables detected; and an access control section which performs control by having each of the plurality of access instructions access the result table.

The summary of the invention given above does not enumerate all of essential features of the present invention. Sub-combinations of the features also constitute the present invention.

According to the present invention, the efficiency of database access can be improved.

BRIEF DESCRIPTION OF THE DRAWINGS

FIG. 1 shows an overall view of an information processing system 10;

FIG. 2 shows an example access program 20;

FIG. 3 shows multiple example tables having a given relation to each other;

FIG. 4 shows a functional configuration of an application server system 30;

FIG. 5 shows a process flow performed by the application server system 30 upon acquisition of an access program 20;

FIG. 6 shows a detail of the operation performed at S540;

FIG. 7 shows a detail of the operation performed at S630;

FIG. 8 shows a detail of the operation performed at S650;

FIG. 9 is a conceptual diagram of a join instruction and a process performed by a conversion instruction;

FIG. 10 shows join instructions generated at S720 and S840 and a summary of runtime processing for executing the join instructions;

FIG. 11 shows example operations by commands generated at S720 and S840 (the first figure of the two figures);

FIG. 12 shows example operations by commands generated at S720 and S840 (the second figure of the two figures);

FIG. 13 shows a program after several commands are generated in an access program 20 by the application server system 30;

FIG. 14 shows a flow of batch processing of the program shown in FIG. 13;

FIG. 15 shows an overall outline of the process according to the present embodiment;

FIG. 16 shows a DB structure used in the experiment;

FIG. 17 shows bean dependency graphs of an access program used in the experiment;

FIG. 18 shows characteristics of tables used in the experiment; and

FIG. 19 shows an example hardware configuration of an information processing apparatus 500 that functions as the application server system 30.

DETAILED DESCRIPTION

The present invention will be described with respect to an embodiment thereof. However, the embodiment described below does not limit the present invention defined in the Claims, and all of the combination of features described in the embodiment is not necessarily requisites for the solution according to the present invention.

FIG. 1 shows an overall structure of an information processing system 10. The information processing system 10 includes an application server system 30, a DB management server 40, and a DB 45. The application server system 30 obtains and executes an access program 20. The application server system 30 then sends a request for accessing the DB 45 to the DB management server 40 in accordance with the instructions written in the access program 20. More specifically, the application server system 30 includes a virtual machine that implements the J2EE (Java®2 Enterprise Edition) specifications and also includes the functions of JDBC (Java® DataBase Connectivity). The application server system 30 obtains an access program 20 written in Java®, makes required optimizations to the access program 20, and executes it.

In response to the request from the application server system 30, the DB management server 40 obtains data from the DB 45 and returns it to the application server system 30. The DB 45 contains data accessed by the application server system 30. The DB 45 may have a structure called the relational database, which stores data in the form of tables in such a manner that the data can be searched by using a key. The application server system 30 has a buffer memory 35 for temporarily storing data retrieved from the DB 45. The buffer memory 35 is, for example, a storage area of the EJB container, called bean cache, which stores records of the tables making up the DB 45, as objects called the beans.

The application server system 30 is connected to the DB management server 40 through an electric communication line, and the transmission speed can be relatively low. In such a case, frequent accesses from the application server system 30 to the DB 45 will increase the communication time and reduce the efficiency of processing. A purpose of the application server system 30, according to the present invention, is to analyze processing performed by an access program 20, and to reduce the frequency of accesses to the DB 45 without affecting the result of the processing by the access program 20, thereby improving the efficiency of the processing.

FIG. 2 shows an example of access program 20. The 1st to 37th lines of the program code represent one batch process as a whole. The 3rd line of the program code represents an operation for obtaining input data used in the batch process. The 11th to 31st lines of the program code represent the main body of the transaction processing of the batch process. The 8th line of the program code represents the beginning of the transaction processing.

The 11th to 31st lines of the program code represent an inner loop which is a subsection of the batch process between checkpoint candidates. The position of the checkpoints may not be statically predetermined. They may be dynamically chosen from checkpoint candidates according to a management policy. For example, a shorter checkpoint interval may be set for daytime operation in which batch processing is performed concurrently with online transactions, in comparison to the interval in nighttime operation in which only batch processing is performed.

The 16th line of the program code in the inner loop represents an operation for obtaining a record in a table using the variable "customerKey" as the primary key. Similarly, the 21st line of the program code represents an operation for obtaining a record in another table using the variable "creditKey" as the primary key. Similarly, the 26th line of the program code represents an operation for obtaining a record in another table using the variable "debitKey" as the primary key.

The 33rd line of the program code represents an operation for calling a container service for performing checkpoint operation. The 35th line of the program code represents an operation for committing the result of one transaction.

FIG. 3 shows an example of tables having a specific relation with one another. FIG. 3 (a) shows the relation between beans generated from multiple tables accessed in the access program 20 in FIG. 2. A bean is an object converted from a record extracted from a DB table into a form accessible by a Java® program.

As shown in FIG. 3 (a), the bean "customer" depends on the input data "input". That is, the table "customer", which is an example of a first table, is accessed by a first access instruction on the basis of the input data "input". The bean "creditAccount" depends on the bean "customer". That is, the table "creditAccount", which is an example of a second table, is accessed by a second access instruction using an element in a record from the table "customer" as an access key.

The bean "customer" depends on the input data "input". That is, the table "customer", which is an example of the first table, is accessed by the first access instruction on the basis of the input data "input". The bean "debitAccount" depends on the bean "customer". That is, the table "debitAccount", which is an example of the second table, is accessed by the second access instruction using an element in a record from the table "customer" as an access key.

In this way, according to the access program 20, the application server system 30 makes the second access to the database on the basis of the result of the first access to the database. The range of data accessed at the first access may be analyzable before starting an inner loop of the batch process. For example, the table "customer" is accessed on the basis of the input data "input" and the content of the input data "input" is available before the inner loop is started. Therefore, an optimization can be made to the program by fetching required data from the table "customer" at the outside of the inner loop, for example, at the 9th line in FIG. 2.

On the other hand, the range of data accessed at the second access cannot be identified beforehand in most cases, because it depends on the result of the first access. That is, the bean "creditAccount" in the access program 20 depends on the bean "customer". The content of the bean "customer" is not available at the time the inner loop begins. Therefore, in the inner loop, for example at the 21st line, access has to be made to the table "creditAccount" every iteration of the inner loop. A purpose of the application server system 30 is to reduce the number of such inefficient database accesses.

FIG. 3 (b) shows the relation between tables to be optimized by the application server system 30 according to the present embodiment besides the above examples. FIG. 3 (b-1) shows another example of access program. The 1st line of the program code represents an operation for storing input data in the variable "cID". The 2nd line represents an operation for retrieving a record in the corresponding table for the home interface of the bean "A" by using this variable as the key. Similarly the 3rd line represents an operation for retrieving a record in the corresponding table for the home interface of the bean "B" by using this variable as the key.

FIG. 3 (b-2) shows the relation between the tables in the access program. Tables A and B are accessed by access instructions using an identical key "cID". Another purpose of the application server system 30, according to the present embodiment, is to integrate separate accesses to two tables in such a relation into one, thereby improving the efficiency of processing.

FIG. 4 shows a functional configuration of the application server system 30. The application server system 30 has the buffer memory 35 as mentioned above, and also includes an acquiring section 300, a detecting section 310, an analyzing section 320, a measurement control section 330, a join control section 340, a conversion control section 350, a determining section 360, a view control section 370, and an execution section 380. The acquiring section 300 acquires an access program 20 including access instructions to access the DB 45. The detecting section 310 detects multiple different tables accessed by the access instructions included in the access program 20. The analyzing section 320 statically analyzes the access program 20 to identify characteristics of the access instructions included in the access program 20.

For example, the analyzing section 320 may analyze the access program 20 to determine, for each access instruction, whether the access instruction will be executed whenever the access program 20 is executed. The measurement control section 330 causes a measure instruction to be executed to obtain the probability that an access instruction that is found to be not necessarily executed within the program will be executed, during the execution of the access program 20. For example, the measurement control section 330 may insert the measure instruction in the access program 20. Techniques, called profiling or otherwise, for measuring the probability of execution are well-known in the conventional art and therefore further description thereof will be omitted.

The analyzing section 320 may determine whether the first access instruction uses a primary key to access the first of the multiple tables detected by the detecting section 310 and the second access instruction uses the primary key to access the second among those tables. In this case, if at least one of the first and second tables is not accessed with the primary key, the measurement control section 330 causes a measure instruction to be executed to determine the redundancy of records when a join instruction is used for those tables.

The join control section 340 executes a join instruction for obtaining a combined result table from multiple tables detected in the DB 45, prior to the execution of access instructions that access the multiple tables. The join instruction is a SELECT command in SQL (Structured Query Language). The SELECT command selects multiple records from the first and second tables that are under predetermined relation, and joins them together to generate a result table.

The conversion control section 350 is an example of an access control section, according to the present invention. The conversion control section 350 executes a conversion instruction that converts an obtained result table into a structure accessible for multiple access instructions, prior to the execution of those access instructions. By using the conversion instruction, those records accessed by multiple access instructions can be extracted from the combined result table into a structure accessible for each of the multiple access instructions. In particular, the conversion instruction generates EJB objects called "bean" from a result table obtained using a SELECT command of SQL.

The determining section 360 determines the remaining capacity of a local memory available to the access program 20. The available local memory capacity may be determined statically on the basis of the access program 20 or may be determined by executing an instruction to measure the available capacity of the local memory during execution of the access program 20. If the available capacity determined by the determining section 360 is greater than a predetermined threshold, the view control section 370 generates a view in the local memory a table into which the first and second tables are joined. In particular, the view control section 370 generates a view command in the access program 20 to be executed during the execution of the access program 20. Furthermore, if the view command is executed, the view control section 370 makes a join instruction access the table generated by the view command instead of the DB 45.

The execution section 380 acquires and executes the access program 20 that includes the controls described above. The execution section 380 accesses the DB 45 by executing the access program 20. Records in the DB 45 are temporarily stored in the buffer memory 35 under the control of the join instruction and the conversion instruction. The execution section 380 also reads the temporarily stored records from the buffer memory 35, instead of the DB 45.

FIG. 5 shows a process performed by the application server system 30 upon acquisition of an access program 20. The acquiring section 300 acquires an access program 20 (S500). The detecting section 310 generates a call graph for the access program 20 (S510). For example, the detecting section 310 may use a disambiguation technique for the receiver object type through type information analysis or a class hierarchy analysis technique to identify the target of a method call. As a result, the order in which the instructions in the access program 20 are executed can be obtained.

The detecting section 310 then generates bean dependency graphs representing the dependencies between the access instructions included in the access program 20 (S520). In particular, the detecting section 310 scans the generated call graph to determine the dependencies between the access instructions. For example, if the access program 20 is written in J2EE, the dependency between access instructions can be determined on the basis of both the dependency between access keys used in finder methods, and of the state of access to the fields by getter methods or setter methods of entity beans. Examples of the bean dependency graph are shown in FIGS. 3 (a) and 3 (b-2).

The detecting section 310 then collects schema information from the DB 45 (S530). In particular, the detecting section 310 collects information about primary keys, foreign keys of the tables in the DB 45, and the data types and sizes of all columns of those tables. This operation can be accomplished by using DatabaseMetaData APIs of JDBC.

Then, the application server system 30 detects the multiple tables and performs an operation for generating join and measure instructions for the tables (S540). Then, the conversion control section 350 generates a conversion instruction that extracts records from a result table and converts them into a structure accessible for the multiple access instructions (S550).

FIG. 6 shows details of the operation at S540. The detecting section 310 selects nodes in the bean dependency graph sequentially, in the order from the root to the leaf nodes, and repeats the following process for each of the selected node (S600). When a join instruction is made for two tables, the detecting section 310 newly generates a node into which the two nodes representing the two tables are joined. That is, determination is made recursively for joining three or more tables. The process is described in detail below.

First, the detecting section 310 selects a pair of nodes, a node and its child (S610). With this operation, the detecting section 310 can detect the first table accessed by the first access instruction and the second table accessed by the second access instruction using an element in a record from the first table as a key.

The detecting section 310 also detects a set of sibling nodes. With this operation, the detecting section 310 can detect multiple tables accessed by multiple access instructions under the same key. Then, the analyzing section 320 determines, for the detected multiple tables, whether the first access instruction accesses the first table using a primary key and also determines whether the second access instruction accesses the second table using a primary key (S620). If both tables are accessed with a primary key (S620: YES), then the analyzing section 320 proceeds for generating instructions (S630).

On the other hand, if either one of the first or second tables is not accessed with a primary key (S620: NO), then the analyzing section 320 determines whether a record extracted by the first access instruction is used in the second access instruction (S640). For example, if the tables are in a relation like that between the tables "customer" and "creditAccount" shown in FIG. 3 (a), the analyzing section 320 determines that the record extracted by the first access instruction is used in the second access instruction. On the other hand, if they are in a relation like that between the tables A and B shown in FIG. 3 (b-1), the analyzing section 320 determines that the record extracted by the first access instruction is not used in the second access instruction.

If the record read by the first access instruction is not used in the second access instruction (S640: NO), then the analyzing section 320 proceeds to S650. On the other hand, if the record read by the first access instruction is used in the second access instruction (S640: YES), the analyzing section 320 determines whether the record read by the first access instruction is being used only in the second access instruction and not used in any other instructions (S660). If it is not being used in any other instructions (S660: YES), the analyzing section 320 proceeds to S630. On the other hand, if it is being used in any other instruction (S660: NO), the analyzing section 320 proceeds to S650. The application server system 30 repeats the above-mentioned process for each bean (S670). FIG. 7 shows a detail of the operation at S630. The analyzing section 320 determines whether the probability of executing an access instruction that accesses the detected multiple tables is 1 or not (S700). That is, the analyzing section 320 determines whether the access instruction will be executed whenever the access program 20 is executed. If the probability of execution is 1 (S700: YES), the join control section 340 generates a join instruction for obtaining a combined result table from the multiple tables (S730). Then, the determining section 360 determines the remaining capacity of the local memory available to the application server system 30 (S740).

If the remaining capacity determined by the determining section 360 is larger than or equal to a predetermined threshold (S750: YES), then the view control section 370 executes a view command to generate in the local memory a table into which the first and second tables are joined (S760). In particular, the view control section 370 may generate the view command in the access program 20 so that it is executed during the execution of the access program 20. In this case, the join control section 340 makes a select command execute for generating a result table from the table generated by the view command, as a join command. As a result, the number of accesses to the DB 45 can be further reduced.

On the other hand, if the probability of executing an access instruction to the detected multiple tables is lower than 1 (S700: NO), the measurement control section 330 generates a measure instruction to obtain the probability of the execution of the access instruction (S710). Then, the join control section 340 generates multiple instruction sequences to be executed in accordance with their execution probabilities (S720). Each of these instruction sequences includes a join instruction that joins multiple tables together. Combinations of tables to be joined vary depending on the instruction sequences.

FIG. 8 shows a detail of the operation at S650. The measurement control section 330 executes a measure instruction to obtain the redundancy during the execution of the access program 20 (S800). For example, the measurement control section 330 may generate the measure instruction in the access program 20. The measure instruction is an instruction that measures the redundancy, which is the proportion of the number of redundant records to the number of records read by a join instruction if it is generated. The redundancy can be calculated as:

$$\text{redundancy} = AR(A)*(N-1)/((AR(A)+AR(B))*N)$$

Here, N represents the number of records in one (B) of the tables to be joined together by the join instruction that correspond to one record in the other table (A). N is a value called "cardinality". AR (A) represents the record length of table A, and AR (B) represents the record length of table B. That is, higher the cardinality, the larger the redundancy. Also, the shorter the record length of table A, the smaller the redundancy, even if the cardinality is high. The measure instruction dynamically detects a set of records to be accessed, obtains lengths of the records from the schema information, and calculates the redundancy from a runtime profile of the cardinality between the tables to be accessed.

If the redundancy has been measured by using offline profiling beforehand, the measuring control section 330 does not have to generate a measure instruction for measuring the redundancy. In this case, the join control section 340 may generate instruction sequences on the basis of that redundancy measured beforehand.

The analyzing section 320 determines whether the probability of executing access instructions accessing the detected multiple tables is 1 or not (S810). That is, the analyzing section 320 determines whether the access instruction will be executed whenever the access program 20 is executed. If the probability of execution is 1 (S810: YES), the join control section 340 generates both an instruction sequence including a join instruction, and an instruction sequence that does not include a join instruction and in which the multiple access instructions individually accesses the multiple tables (S820). One of these instruction sequences will be selected and executed at runtime on the basis of the redundancy measured by the measure instruction.

If the probability of execution is lower than 1 (S810: NO), the measurement control section 330 generates a measure instruction to obtain the probability of executing the access instruction (S830). Then, the join control section 340 generates multiple instruction sequences to be executed according to their probabilities (S840). Each of these instruction sequences includes a join instruction to join multiple tables together. Combinations of tables to be joined vary depending on the instruction sequences.

FIG. 9 shows a conceptual diagram of a join instruction and a process performed by a conversion instruction. In the example shown, the join instruction obtains from the DB 45 a result table that is generated by joining the customer table and the creditAccount table. In particular, the join instruction is a SELECT command of SQL. An example of the SELECT command generated is shown below.

select a.*, b.* from Customer_TABLE a, creditAccount_TABLE b where a.accessKey=? and join_condition Here, the portion "join_condition" is provided with an equality expression of the access keys, if "a" and "b" are in a relation in which they share an access key. For example, "a.accessKey1a=b.accessKey1b and . . . ". On the other hand, if "a" and "b" are in a dependent relation with respect to an access key, the portion "join_condition" is provided with a condition for selecting matching columns. For example, "a.column1=b.accessKey1 and a.column2=b. accessKey2 and . . . ". In this example, when the data in column1 of table a is used as a key to access table b, the records can be retrieved from tables a and b with one query.

The join instruction generates a result table in which the records in the Customer table and the records in the creditAccount table are joined together. The Customer table has the primary key "customerKey". However, "accessKey1" in the join condition "a.column1=b.accessKey1" is not necessarily a primary key of the creditAccount table. Therefore, the records in the Customer table will appear redundantly in the result table.

If more than one identical records are found to have a same primary key in the result table, the join control section 340 extracts one of the multiple records in order to avoid overlaps in a conversion instruction. In the example shown in FIG. 9, the records retrieved from the Customer table have the same primary key. Therefore, the join control section 340 extracts one of these records and converts it into a bean. On the other hand, the records retrieved from the creditAccount table have different primary keys. Therefore, the join control section 340 converts each of these records into a bean.

FIG. 10 shows join instructions generated at S720 and S840 and a summary of runtime processing for executing the join instructions. In this step, the join control section 340 executes a join instruction on the basis of the redundancy that will result if the join instruction is actually executed for joining multiple tables in a parent-child relation or a sibling relation in a bean dependency graph. For example, if the redundancy is lower than a predetermined threshold, the join control section 340 executes the join instruction.

The join control section 340 also generates multiple instruction sequences if an access instruction corresponding to a node to be processed is detected in a particular instruction sequence. If that is the case, the execution section 380 executes any of the instruction sequences on the basis of a runtime decision. An outline of this process will be described below. An example of a particular instruction sequence is shown in FIG. 10 (a).

FIG. 10 (a) shows a control flow of a program including access instructions. After executing an access instruction that accesses the "customer" table, the program executes either one of the instructions that accesses the "creditAccount" table or the "debitAccount" table.

If an access instruction is detected in a particular instruction sequence like the one given above, the join control section 340 may execute a join instruction to join three tables accessed by the three access instructions together. In particular, the detecting section 310 detects the first table accessed by the first access instruction, the second table accessed by the second access instruction using an element in a record extracted from the first table as the key, and the third table accessed by the third access instruction using an element in the record as the key. FIG. 10 (a) shows a specific example. The detecting section 310 detects the first table, "customer", the second table, "creditAccount", and the third table, "debitAccount".

As shown in FIG. 10 (b), if the redundancy is lower than a predetermined threshold, the join control section 340 executes a join instruction. In particular, the join control section 340 executes either of the following instructions: the first join instruction that joins the table "customer" with one of the tables "creditAccount" or "debitAccount", or the second join instruction that joins the table "customer" with both of the tables "creditAccount" and "debitAccount".

FIG. 11 (the first of the two figures) shows an example operation of commands generated at S720 and S840. FIG. 12 (the second of the two figures) shows an example operation of commands generated at S720 and S840. FIG. 11 (a) shows an operation of a command executed if the measured redundancy is higher than a threshold value. The join control section 340 retrieves a record from the table "customer" before the inner loop is started. However, the join control section 340 does not execute a join instruction that joins the table "customer" with any other table.

FIGS. 11 (b) and 12 (a) show operations of join instructions that are executed if the measured redundancy is lower than the threshold value and the probabilities of executing multiple access instructions are biased. For example, if the difference between the probability of execution of an access instruction that accesses the table "creditAccount" (hereinafter referred to as the "execution probability P") and the probability of execution of an access instruction that accesses the table "debitAccount" (hereinafter referred to as the "execution probability 1−P) is greater than a predetermined threshold value, the join control section 340 may determine that the probabilities of execution are biased.

If the probabilities of execution are biased and the execution probability P is greater than the execution probability (1−P), the join control section 340 executes join instruction to obtain a result table where the table "customer" and the table "creditAccount" are joined. On the other hand, if the probabilities of execution are biased and the execution probability (1−P) is greater than the execution probability P, the join control section 340 executes a join instruction to obtain a result table where the table "customer" and the table "debitAccount" are joined.

FIG. 12 (b) shows an operation by a join instruction that is executed if the measured redundancy is less than the threshold value and the probabilities of execution of multiple access instructions are approximately equal. For example, if the difference between the execution probabilities P and (1−P) is less than or equal to a predetermined threshold value, the join control section 340 may determine that the probabilities of the execution are approximately equal. If it determines that the probabilities of execution are approximately equal, the join control section 340 executes a join instruction to obtain a combined result table where the tables "customer", "creditAccount" and "debitAccount" are joined.

FIG. 13 shows an example program after the application server system 30 generates commands for the access program 20. The view control section 370 generates a view command on the 4th line of the access program 20 so that the command is executed if the determining section 360 determines that the available capacity of the local memory is larger than a predetermined threshold value. That is, if the condition is met, the execution section 380 generates in the local memory a table into which multiple tables are joined, prior to the execution of the batch processing that begins from the 6th line.

The join control section 340 also generates a join instruction on the 9th line of the access program 20. This means that the execution section 380 obtains a result table into which multiple tables are joined from the DB 45 before starting the execution of the inner loop at the 11th line. If a view command is generated at the 4th line, the execution section 380 generates a result table from the table generated by the view command, instead of the DB 45.

The conversion control section 350 also generates a conversion instruction on the same 9th line. This means that the execution section 380 extracts records from the result table after it is generated for the multiple access instructions. Then, the execution section 380 converts the extracted records into a structure accessible for the multiple access instructions.

The measurement control section 330 generates a measure instruction on the 22nd line of the access program 20. That is, the execution section 380 increments a preset counter by 1 each time the 22nd line is executed. With this counter, the number of execution of the access instruction to the "creditAccount" table can be counted and the probability of the execution can be determined on the basis of the number of execution. The execution section 380 measures the redundancy that indicates how much redundant the combined records will be if a join instruction is generated, on the basis of the result of access to the "customer" table and the result of access to the "creditAccount" table. Based on the redundancy, a decision can be made dynamically as to whether a join instruction generated for joining the "customer" table and the "creditAccount" table should be executed or not.

Similarly, the measurement control section 330 generates a measure instruction on the 27th line of the access program. That is, the execution section 380 increments a preset counter by 1 each time the 27th line is executed. With this counter, the number of execution of the access instruction to the "debitAccount" table can be counted and the probability of the execution can be determined on the basis of the number of execution. The execution section 380 also measures the redundancy that indicates how much redundant the combined records will be if a join instruction is generated, on the basis of the result of access to the "customer" table and the result of access to the "debitAccount" table. Based on the redundancy, a decision can be made dynamically as to whether a join instruction generated for joining the "customer" table and the "debitAccount" table should be executed or not.

FIG. 14 shows a flow of the batch processing of the program shown in FIG. 13. The execution section 380 determines at the 11th line whether the transaction being executed has reached a checkpoint. If it has not reached a checkpoint (S1400: NO), the execution section 380 executes one iteration of the inner loop (S1410). The execution section 380 also executes a measure instruction (S1420).

On the other hand, if the transaction has reached a checkpoint (S1400: YES), the execution section 380 exits the inner loop, proceeds to the 35th line, and commits the transaction (S1430). The execution section 380 then returns the control to the 9th line, and obtains the result of measurement of the execution probability and the redundancy measured by the measurement instructions (S1440). If the redundancy is greater than or equal to a predetermined threshold value (1450: YES), the execution section 380 does not execute a join instruction (S1460).

If the redundancy is less than the predetermined threshold value (S1450: NO), the execution section 380 executes a join instruction on the basis of the probability of execution (S1470). The join instruction to be executed varies depending on the probability of execution of the access instruction to the "creditAccount" table and that of the access instruction to the "debitAccount" table. For example, if the probability of access to the "creditAccount" table and that of access to the "debitAccount" table are approximately equal, the execution section 380 executes a join instruction that joins the three tables together, "customer", "creditAccount", and "debitAccount".

Then, the execution section 380 extracts records accessed by the access instructions from the result table and converts them into a structure accessible for the access instructions (S1475). The execution section 380 then resets the counter used for measuring the probability of execution so that the probability of execution in the next inner loop can be measured (S1480).

FIG. 15 shows an overall outline of a process in the present embodiment. The execution section 380 executes a view command before starting the batch processing (S1500). As a result, the "customer" table, "creditAccount" table, and the "debitAccount" table are read from the DB management server 40 and these tables are joined to generate a combined view table.

Then, the execution section 380 starts a batch processing transaction (S1510). The execution section 380 executes a join instruction to generate a result table (S1520). The execution section 380 then converts each record of the generated result table into a structure accessible for access instructions and stores it in the buffer memory 35. For example, a record of the result table may be converted into an object of J2EE, called bean. Next, the execution section 380 iterates the inner loop (S1530). The execution section 380 then commits the transaction (S1540).

The following is a description of experiment results on database access using the application server system 30 of the present embodiment and the conditions under which the experiment was conducted.

FIG. 16 shows the dependencies between tables referred to in a program used in the experiment. In the experiment, the application server system 30 controls DB access to the structure shown in FIG. 16. A benchmark program called TPC-C was used in the experiment. TPC-C is a benchmark program for evaluating the performance of online transactions. In the experiment on the present embodiment, customer requests in TPC-C are randomly generated and are written in a file, and the file is used as an input to perform a batch processing of the transaction.

In the experiment, two (OrderStatus and NewOrder) scenarios specified in TPC-C are used. In OrderStatus, the application server system 30 makes read-only access to three tables (Customer, Order, and OrderLine). In NewOrder, on the other hand, the application server system 30 makes read-only access to three tables (Warehouse, Customer, and Item), reads and updates two other tables (District and Stock), and performs insertion operations to another three tables.

Each box in FIG. 16 represents a table, the text in each box represents the name of the table, and the number in each box represents the amount of the records. That is, the table "Warehouse" in the DB 45 has one record. The tables "District", "Customer", "Order", "OrderLine", "Stock", and "Item" have 10, 30,000, 30,000, 300,000, 100,000, and 100,000 records, respectively.

The edges interconnecting the boxes represent mapping of records. For example, the single record in the table "Warehouse" maps to the 10 records in the table "District". One record in the table "District" maps to 3,000 records in the table "Customer".

FIG. 17 shows bean dependency graphs of the access program used in the experiment. FIG. 17 (a) shows the dependencies between beans accessed in the scenario "OrderStatus". The table "Customer" is accessed using a customer ID that can be obtained from input data as a key. As a result of the table access, a Customer bean is generated. The table "Order" is accessed using a customer ID that can be obtained from input data as a key. As a result of the table access, an Order bean is generated. The table "OrderLine" is accessed using an order ID that can be obtained from an Order bean. As a result of the table access, an OrderLine bean is generated.

FIG. 17 (b) shows the dependencies between beans accessed in the scenario "NewOrder". The table "Warehouse" is accessed using a warehouse ID that can be obtained from input data as a key. As a result of the table access, a Warehouse bean is generated. The table "District" is accessed using a district Id that can be obtained from input data as a key. As a result of the table access, a District bean is generated.

The table "Customer" is accessed using a customer ID that can be obtained from input data as a key. As a result of the table access, a Customer bean is generated. The table "Item" is accessed using an item ID that can be obtained from input data as a key. As a result of the table access, an Item bean is generated. The table "Stock" is accessed using an item ID that can be obtained from input data. As a result of the table access, a Stock bean is generated.

FIG. 18 shows characteristics of the tables used in the experiment. Primary keys and the length of access records of the tables can be obtained from schema information in the DB. The primary key of the table "Warehouse" is a warehouse ID and the length of the access record is 6. The primary key of the table "District" is a district ID and the length of the access record is 10.

Under the conditions described above, the application server system 30 executes the scenarios "OrderStatus" and "NewOrder". A summary of the results is given below.

(1) OrderStatus

The tables "Customer" and "Order" are both accessed using the same primary key, customer ID. Therefore, a decision made at S620 in FIG. 6 is YES and the operation in S630 shown in FIG. 7 is performed. Because the probability of execution of this access instruction is 1, a join instruction is generated (S730).

The Order bean has field accesses other than that for the access key to the table "OrderLine". Therefore, a decision at S660 in FIG. 6 is NO and the operation in S650 in FIG. 8 is performed. That is, a measure instruction for measuring redundancy is generated (S800) and a separate instruction sequence is generated for each of the cases where a join is performed and not performed (S840).

As a result, the application server system 30 generates an instruction sequence that includes a join instruction for two tables "Customer" and "Order" and an instruction sequence that includes a join instruction for the three tables "Customer", "Order", and "OrderLine". Then, either of the two instruction sequences is dynamically selected and executed on the basis of the measured redundancy (S1450).

(2) NewOrder

All tables are accessed using input data as a key. Therefore, no dependency exist between accesses to these tables. Mapping between the tables, except for the Item bean and Stock bean, is unknown. Therefore, a measure instruction is generated for measuring the redundancy for each of all combinations. In addition, for each of all combination of the tables (all of the combinations of two tables, three tables, and four tables), multiple instruction sequences are generated, each of which includes a join instruction that joins the tables in that particular combination.

As a result of the measurement of the redundancy, the tables to be joined by the join instructions are grouped.

In particular, the mapping ratio of the two tables (warehouse, district) is 1:10. Therefore, if a join instruction is generated for these tables, the redundancy measured will be extremely high. On the other hand, it can been seen that, the redundancy will be low if the tables (warehouse, district) are combined with the table "customer", because the access record length of the tables (warehouse, district) is small. Therefore, among the multiple instruction sequences generated, execution will be made for a join instruction that joins the tables (warehouse, district, customer) and a join instruction that joins the tables (item, stock).

As a result of generating the join instructions, it was observed that the performance improvement is 24.5% for the scenario OrderStatus and 6.1% for the scenario NewOrder.

FIG. 19 shows an example hardware configuration of an information processing apparatus 500 that functions as the application server system 30. The information processing apparatus 500 includes a CPU section including a CPU 1000, a RAM 1020, and a graphics controller 1075 which are interconnected through a host controller 1082, an input/output section including a communication interface 1030, a hard disk drive 1040, and a CD-ROM drive 1060 which are connected to the host controller 1082 through the input/output controller 1084, and a legacy input/output section including a BIOS 1010, a flexible disk drive 1050, and an input/output chip 1070 which are connected to the input/output controller 1084.

The host controller 1082 connects the CPU 1000 and the graphic controller 1075, which access the RAM 1020 at higher transfer rates, with the RAM 1020. The CPU 1000 operates according to programs stored in the BIOS 1010 and the RAM 1020 to control components of the information processing apparatus 500. The graphic controller 1075 obtains image data generated by the CPU 1000 and the like on a frame buffer provided in the RAM 1020 and causes it to be displayed on a display device 1080. Alternatively, the graphics controller 1075 may contain within it a frame buffer for storing image data generated by the CPU 1000 and the like.

The input/output controller 1084 connects the host controller 1082 with the communication interface 1030, the hard disk drive 1040, and the CD-ROM drive 1060, which are relatively fast input/output devices. The communication interface 1030 communicates with external devices through a network. The hard disk drive 1040 stores programs and data used by the information processing apparatus 500. The CD-ROM drive 1060 reads a program or data from a CD-ROM 1095 and provides it to the RAM 1020 or the hard disk drive 1040.

Connected to the input-output controller 1084 are relatively slow input/output devices such as the flexible disk drive 1050, and the input/output chip 1070. The BIOS 1010 stores a boot program executed by the CPU 1000 during boot-up of the information processing apparatus 500 and programs dependent on the hardware of the information processing apparatus 500. The flexible-disk drive 1050 reads a program or data from a flexible disk 1090 and provides it through the input/output chip 1070 to the RAM 1020 or the hard disk drive 1040. The input/output chip 1070 connects the flexible disk 1090, and various input/output devices through ports such as a parallel port, serial port, keyboard port, and mouse port, for example.

A program to be provided to the information processing apparatus 500 is stored on a recording medium such as a flexible disk 1090, a CD-ROM 1095, or an IC card and provided by a user. The program is read from the recording medium and installed in the information processing apparatus 500 through the input/output chip 1070 and/or input/output controller 1084 and executed. Operations performed by the information processing apparatus 500 under the control of the program are the same as the operations in the application server system 30 described with reference to FIGS. 1 to 18 and therefore the description thereof will be omitted.

The programs mentioned above may be stored in an external storage medium. The storage medium may be a flexible disk 1090 or a CD-ROM 1095, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the program may be provided from the storage device to the information processing apparatus 500 over the network.

While the present invention has been descried with respect to an embodiment thereof, the technical scope of the present invention is not limited to that described with the embodiment. It will be apparent to those skilled in the art that various modifications or improvements can be made to the embodiment. It will be apparent from the Claims that embodiment to which such modifications and improvements are made also fall within the technical scope of the present invention.

We claim:

1. A computer-implemented system for controlling an access to a database, comprising:
   an application server system including at least one computer server with an acquiring section that acquires an access program including a plurality of database access instructions;
   a detecting section which detects a plurality of different tables in the database that are accessed by the plurality of access instructions;
   an analyzing section which determines, for the plurality of tables detected by the detecting section, whether a first access instruction accesses a first table by using a primary key and a second access instruction accesses a second table by using the same primary key;
   a join control section which executes a first join instruction prior to the execution of the access instructions, the first join instruction obtaining a result table from the database by combining the plurality of different tables detected, wherein the join control section executes a second join instruction that joins the first table with the second table, if the first access instruction and the second access instruction access the first table and the second table by using the same primary key;
   the join control section further determining a sequence in which the plurality of different tables are accessed, and joining the plurality of different tables to create the sequence of access;
   a measurement control section which executes a measure instruction during an execution of the access program if either the first or the second tables is not accessed by using the primary key, the measure instruction measuring a redundancy which is a proportion of a number of redundant records to a total number of records read by a third join instruction if the third join instruction is generated,
   wherein the join control section executes the third join instruction that joins the first table with the second table, if the redundancy measured by the measure instruction during the execution of the access program is less than a predetermined threshold value;
   an access control section which performs control by having each of the plurality of access instructions access the result table;
   the access control section further generating a call graph for the access program; and
   a display section which displays the call graph on a display device.

2. The system according to claim 1, wherein the access control section executes a conversion instruction prior to the execution of the plurality of access instructions, the conversion instruction extracting records from the result table for the plurality of access instructions and converting the records into the form of a structure accessible for the plurality of access instructions.

3. The system according to claim 1, wherein:
   the detecting section detects a plurality of tables accessed by a plurality of access instructions using the a same general key; and
   the join control section executes an instruction that extracts records having the same general key from each of the plurality of tables and joins the records into a single record as the join instruction.

4. The system according to claim 1, wherein:
   the detecting section detects both a first table accessed by a first access instruction, and a second table accessed by a second access instruction by using an element in a record from the first table as a general key; and the join control section executes an instruction that joins a record in the first table with a record in the second table, which is read by using an element in the first record as the general key, into a single record as the join instruction.

5. The system according to claim 1, wherein the join control section executes a select command as the join instruction, the select command selecting a plurality of records under a prespecified relationship from the first and second tables and joining the plurality of records together to generate the result table.

6. The system according to claim 5, further comprising:
a determining section which determines the remaining capacity of memory available to the access program; and
a view control section which executes a view command if the remaining memory capacity determined by the determining section is greater than a predetermined threshold value, the view command generating in the memory a table into which the first and second tables are joined;
the join control section executing a select command for generating the result table from the tables generated by the view command as the join instruction.

7. The system according to claim 1, wherein:
if a plurality of records that have the same primary key are detected in the result table, the access control section extracts one of the plurality of records.

8. The system according to claim 1, further comprising:
an analyzing section which analyzes the access program to determine, for each of the access instructions, whether the access instruction is executed whenever the access program is executed; and
a measurement control section which executes a measure instruction during the execution of the access program, the measure instruction measuring the probability of executing the access instruction which is considered not necessary.

9. The system according to claim 8, wherein:
the detecting section detects a first table accessed by a first access instruction, a second table accessed by a second access instruction by using an element in the record from the first table as a general key, and a third table accessed by a third access instruction by using an element in the record as the general key; and
the join control section executes, on the basis of the probability measured by the measure instruction during the execution of the access program, either of the first join instruction or the second join instruction, the first join instruction joining the first table with either one of the second or the third tables, and the second join instruction joining the first table with both of the second and the third tables.

10. The system according to claim 1, wherein:
the detecting section detects a first table accessed by a first access instruction and a second table accessed by a second access instruction by using an element in a record from the first table as a general key;
the system further comprises an analyzing section which analyzes the access program to determine whether the record extracted by the first access instruction is used in the second access instruction and is not being used by any other instructions; and
the join control section executes the join instruction that joins the first table with the second table if the record extracted by the first access instruction is used in the second access instruction and is not being used by any other instructions.

11. A computer-implemented method controlling access to a database, comprising:
a step of acquiring an access program including a plurality of database access instructions;
a step of detecting a plurality of different tables in the database that are accessed by the plurality of access instructions;
a step of performing join control by executing a join instruction prior to the execution of the access instructions, the join instruction obtaining a result table from the database by combining the plurality of different tables detected; and
the step of performing join control further determining a sequence in which the plurality of different tables are accessed, and joining the plurality of different tables to create the sequence of access;
a step of generating a measure instruction to obtain a probability of executing the access instructions when a probability of executing the access instructions to the plurality of different tables is less than one;
a step of performing access control by having each of the plurality of access instructions access the result table;
a step of analyzing to determine, for a plurality of tables detected by the detecting step, whether a first access instruction accesses a first table by using a primary key and a second access instruction accesses a second table by using the first primary key;
wherein the join control step executes the join instruction that joins the first table with the second table if the first and the second access instructions access the tables by using the first primary key;
a step of performing measurement control to execute a measure instruction during the execution of the access program if either the first or the second tables is not accessed by using the first primary key, the measure instruction measuring the redundancy which is the proportion of the number of redundant records to the total number of records read by the join instruction if the join instruction is generated;
wherein the join control step executes the join instruction that joins the first table with the second table if the redundancy measured by the measure instruction during the execution of the access program is less than a predetermined threshold value;
a step of generating a call graph for the access program; and
a step of displaying the call graph on a display device.

12. The method according to claim 11, wherein the access control step executes a conversion instruction prior to the execution of the plurality of access instructions, the conversion instruction extracting records from the result table for the plurality of access instructions and converting the records into the form of a structure accessible for the plurality of access instructions.

13. The method according to claim 11, wherein:
the detecting step detects a plurality of tables that are accessed by a plurality of access instructions using the a same key; and
the join control step executes an instruction that reads records from each of the plurality of tables using the a same key value and joins the records into a single record, as the join instruction.

14. The method according to claim 11, wherein:
the detecting step detects a first table accessed by a first access instruction and a second table accessed by a second access instruction by using an element in a record read from the first table as a key; and the join control step executes an instruction that joins a record in the first table with records in the second table that is read by using an element in the first record as the key, as the join instruction.

15. The method according to claim 11, wherein:

the detecting step detects a first table accessed by a first access instruction and a second table accessed by a second access instruction by using an element in a record read from the first table as a key;

the method further comprising a step of analyzing the access program to determine whether a record read by the first access instruction is used in the second access instruction and is not being used by any other instructions; and a step of performing join control by executing the join instruction that joins the first table with the second table if the record read by the first access instruction is used in the second access instruction and is not being used by any other instructions.

16. A program product executed on a storage medium which causes an information processing apparatus to function as a system controlling access to a database, the program causing the information processing apparatus function as:

an acquiring section which acquires an access program including a plurality of database access instructions;

a detecting section which detects a plurality of different tables in the database that are accessed by the plurality of access instructions;

a join control section which executes a join instruction prior to the execution of the access instructions, by obtaining a result table from the database by combining the plurality of different tables detected;

a measuring section which generates a measure instruction to obtain a probability of executing the access instructions when a probability of executing the access instructions to the plurality of different tables is less than one, and the access control instructions are executed according to the probability of executing the access control instructions;

an access control section which performs control by having each of the plurality of access instructions access the result table;

an analyzing section which determines, for a plurality of tables detected by the detecting step, whether a first access instruction accesses a first table by using a primary key and a second access instruction accesses a second table by using the first primary key;

wherein the join control step executes the join instruction that joins the first table with the second table if the first and the second access instructions access the tables by using the first primary key;

a measurement control section which performs measure control to execute a measure instruction during the execution of the access program if either the first or the second tables is not accessed by using the first primary key, the measure instruction measuring the redundancy which is the proportion of the number of redundant records to the total number of records read by the join instruction if the join instruction is generated;

wherein the join control section executes the join instruction that joins the first table with the second table if the redundancy measured by the measure instruction during the execution of the access program is less than a predetermined threshold value a call graph generation section which generates a call graph for the access program; and a display section that displays the call graph on a display device.

* * * * *